United States Patent
Guard

(10) Patent No.: US 9,454,252 B2
(45) Date of Patent: Sep. 27, 2016

(54) TOUCH-SENSOR MESH DESIGN FOR DISPLAY WITH COMPLEX-SHAPED SUB-PIXELS

(71) Applicant: David Brent Guard, Southampton (GB)

(72) Inventor: David Brent Guard, Southampton (GB)

(73) Assignee: Atmel Corporation, San Jose, CA (US)

( * ) Notice: Subject to any disclaimer, the term of this patent is extended or adjusted under 35 U.S.C. 154(b) by 360 days.

(21) Appl. No.: 14/248,117

(22) Filed: Apr. 8, 2014

(65) Prior Publication Data
US 2015/0234509 A1 Aug. 20, 2015

Related U.S. Application Data

(63) Continuation-in-part of application No. 14/183,918, filed on Feb. 19, 2014, now Pat. No. 8,947,391.

(60) Provisional application No. 61/939,913, filed on Feb. 14, 2014.

(51) Int. Cl.
*G06F 3/041* (2006.01)
*G06F 3/044* (2006.01)

(52) U.S. Cl.
CPC ............. *G06F 3/0412* (2013.01); *G06F 3/044* (2013.01); *G06F 3/0416* (2013.01); *G06F 2203/04103* (2013.01); *G06F 2203/04112* (2013.01)

(58) Field of Classification Search
CPC .... G06F 3/0412; G06F 3/0416; G06F 3/044; G06F 2203/04103; G06F 2203/04112
See application file for complete search history.

(56) References Cited

U.S. PATENT DOCUMENTS

| 5,329,577 A | 7/1994 | Norimatsu |
|---|---|---|
| 6,262,704 B1 | 7/2001 | Kurumisawa |
| 6,781,647 B2 | 8/2004 | Fujieda |
| 7,663,607 B2 | 2/2010 | Hotelling |

(Continued)

FOREIGN PATENT DOCUMENTS

WO WO 2012/129247 A2 9/2012

OTHER PUBLICATIONS

Final Office Action for U.S. Appl. No. 14/469,918, Dec. 14, 2015.

(Continued)

*Primary Examiner* — Lun-Yi Lao
*Assistant Examiner* — Peter D McLoone
(74) *Attorney, Agent, or Firm* — Baker Botts L.L.P.

(57) ABSTRACT

In one embodiment, an apparatus includes a touch sensor that includes a mesh of conductive material configured to extend across a display. The mesh includes multiple first lines and multiple second lines of conductive material. The first lines are substantially parallel to each other, and the second lines are substantially parallel to each other. The display includes multiple pixels that each include sub-pixels. Each of the pixels has a first pixel pitch ($PP_x$) along a first axis and a second pixel pitch ($PP_y$) along a second axis that is substantially perpendicular to the first axis. Each of the sub-pixels has a first sub-pixel pitch ($SPP_x$) along the first axis, and each of the sub-pixels has a complex shape that has an average sub-pixel dimension ($SPD_{y,AVG}$) along the second axis. The first lines are configured to extend across the display at a first angle relative to the first axis.

20 Claims, 24 Drawing Sheets

(56) References Cited

U.S. PATENT DOCUMENTS

| | | | |
|---|---|---|---|
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,493,347 B2 | 7/2013 | Chen | |
| 8,519,967 B2 | 8/2013 | Chien | |
| 8,591,279 B1 | 11/2013 | Cok et al. | |
| 8,692,795 B1 | 4/2014 | Kremin | |
| 8,692,802 B1 | 4/2014 | Maharyta | |
| 8,698,767 B2 | 4/2014 | Kwak | |
| 8,711,292 B2 | 4/2014 | Guard | |
| 8,723,824 B2 | 5/2014 | Myers | |
| 8,736,571 B1 | 5/2014 | Guard | |
| 8,797,285 B2 | 8/2014 | Guard | |
| 8,896,573 B1* | 11/2014 | Guard | G06F 3/044 345/174 |
| 8,943,903 B1 | 2/2015 | Guard | |
| 8,947,390 B1 | 2/2015 | Guard | |
| 8,947,391 B1 | 2/2015 | Guard | |
| 8,963,561 B2 | 2/2015 | Yilmaz | |
| 9,075,484 B2* | 7/2015 | Ritter | G06F 3/044 |
| 9,285,942 B1* | 3/2016 | Guard | G06F 3/044 |
| 9,304,617 B2* | 4/2016 | Guard | G06F 3/041 |
| 9,304,639 B2* | 4/2016 | Ishizaki | G06F 3/0412 |
| 2001/0035924 A1 | 11/2001 | Fujieda | |
| 2005/0259082 A1 | 11/2005 | Potsch | |
| 2007/0030222 A1 | 2/2007 | Lee | |
| 2008/0036853 A1 | 2/2008 | Shestak | |
| 2008/0239356 A1 | 10/2008 | Nakano | |
| 2008/0309635 A1 | 12/2008 | Matsuo | |
| 2009/0218310 A1 | 9/2009 | Zhu | |
| 2009/0219258 A1 | 9/2009 | Geaghan | |
| 2009/0273577 A1 | 11/2009 | Chen | |
| 2009/0315854 A1 | 12/2009 | Matsuo | |
| 2010/0079384 A1 | 4/2010 | Grivna | |
| 2010/0149117 A1 | 6/2010 | Chien et al. | |
| 2010/0156769 A1 | 6/2010 | Chang | |
| 2010/0156840 A1 | 6/2010 | Frey | |
| 2010/0194697 A1 | 8/2010 | Hotelling | |
| 2010/0302201 A1 | 12/2010 | Ritter | |
| 2011/0148781 A1 | 6/2011 | Chen et al. | |
| 2011/0157102 A1 | 6/2011 | Ando | |
| 2011/0242028 A1 | 10/2011 | Lee | |
| 2011/0291966 A1 | 12/2011 | Takao et al. | |
| 2012/0013546 A1 | 1/2012 | Westhues | |
| 2012/0031746 A1 | 2/2012 | Hwang | |
| 2012/0044165 A1 | 2/2012 | Kwak et al. | |
| 2012/0112988 A1 | 5/2012 | Nakanishi | |
| 2012/0242588 A1 | 9/2012 | Myers | |
| 2012/0242592 A1 | 9/2012 | Rothkopf | |
| 2012/0242606 A1* | 9/2012 | Mackey | G06F 3/044 345/173 |
| 2012/0243151 A1 | 9/2012 | Lynch | |
| 2012/0243719 A1 | 9/2012 | Franklin | |
| 2012/0262382 A1 | 10/2012 | Guard | |
| 2012/0262412 A1 | 10/2012 | Guard | |
| 2012/0313880 A1 | 12/2012 | Geaghan | |
| 2013/0076612 A1 | 3/2013 | Myers | |
| 2013/0100054 A1 | 4/2013 | Philipp | |
| 2013/0127739 A1 | 5/2013 | Guard | |
| 2013/0127769 A1 | 5/2013 | Guard | |
| 2013/0127771 A1 | 5/2013 | Guard | |
| 2013/0127772 A1 | 5/2013 | Guard | |
| 2013/0127775 A1 | 5/2013 | Yilmaz | |
| 2013/0127776 A1 | 5/2013 | Guard | |
| 2013/0155000 A1 | 6/2013 | Trend et al. | |
| 2013/0207911 A1 | 8/2013 | Barton | |
| 2013/0234974 A1 | 9/2013 | Guard | |
| 2013/0294037 A1* | 11/2013 | Kuriki | H05K 9/00 361/748 |
| 2013/0341070 A1 | 12/2013 | Kim | |
| 2013/0342472 A1 | 12/2013 | Guard | |
| 2014/0152580 A1 | 6/2014 | Weaver | |
| 2014/0152613 A1 | 6/2014 | Ishizaki | |
| 2014/0184936 A1 | 7/2014 | Oh | |
| 2014/0225839 A1 | 8/2014 | Dunphy | |
| 2015/0070292 A1 | 3/2015 | Saran | |
| 2015/0077349 A1 | 3/2015 | Guard | |
| 2016/0062409 A1* | 3/2016 | Guard | G06F 1/1643 349/12 |

OTHER PUBLICATIONS

Notice of Allowance for U.S. Appl. No. 14/525,114, Oct. 27, 2014.
U.S. Appl. No. 14/300,995, filed Jun. 10, 2014, Guard.
Non-Final Office Action for U.S. Appl. No. 14/159,981, May 16, 2014.
Notice of Allowance for U.S. Appl. No. 14/159,981, Jul. 28, 2014.
U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
U.S. Appl. No. 13/910,055, filed Jun. 4, 2013, Guard.
U.S. Appl. No. 14/031,372, filed Sep. 19, 2013, Guard.
U.S. Appl. No. 14/159,981, filed Jan. 21, 2014, Guard.
Non-Final Office Action for U.S. Appl. No. 13/910,055, Sep. 10, 2013.
Response to Non-Final Office Action for U.S. Appl. No. 13/910,055, Dec. 10, 2013.
U.S. Appl. No. 14/183,876, filed Feb. 19, 2014, Guard.
U.S. Appl. No. 14/183,918, filed Feb. 19, 2014, Guard.
Notice of Allowance for U.S. Appl. No. 13/910,055, Jan. 14, 2014.
U.S. Appl. No. 14/248,096, filed Apr. 8, 2014, Guard.
U.S. Appl. No. 14/469,918, filed Aug. 27, 2014, Guard.
U.S. Appl. No. 14/525,114, filed Oct. 27, 2014, Guard.
Non-Final Office Action for U.S. Appl. No. 13/031,372, Jul. 16, 2015.
Response to Non-Final Office Action for U.S. Appl. No. 14/159,981, Jun. 19, 2014.
Notice of Allowance for U.S. Appl. No. 14/183,876, Oct. 14, 2014.
Notice of Allowance for U.S. Appl. No. 14/183,918, Oct. 8, 2014.
Response to Non-Final Office Action for U.S. Appl. No. 14/300,995, Oct. 24, 2014.
Notice of Allowance for U.S. Appl. No. 14/300,995, Nov. 13, 2014.
Non-Final Office Action for U.S. Appl. No. 14/469,918, Dec. 31, 2014.
Response to Non-Final Office Action for U.S. Appl. No. 14/469,918, Mar. 5, 2015.
Final Office Action for U.S. Appl. No. 14/469,918, Mar. 18, 2015.
Response to Final Office Action for U.S. Appl. No. 14/469,918, Apr. 28, 2015.
Response to Final Office Action for U.S. Appl. No. 14/469,918, Jun. 18, 2015.
Non-Final Office Action for U.S. Appl. No. 14/469,918, Jul. 27, 2015.

* cited by examiner

US 9,454,252 B2

TOUCH-SENSOR MESH DESIGN FOR DISPLAY WITH COMPLEX-SHAPED SUB-PIXELS

PRIORITY

This application is a continuation-in-part under 35 U.S.C. §120 of U.S. patent application Ser. No. 14/183,918, filed 19 Feb. 2014, which claims the benefit under 35 U.S.C. §119(e) of U.S. Provisional Patent Application No. 61/939,913, filed 14 Feb. 2014.

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
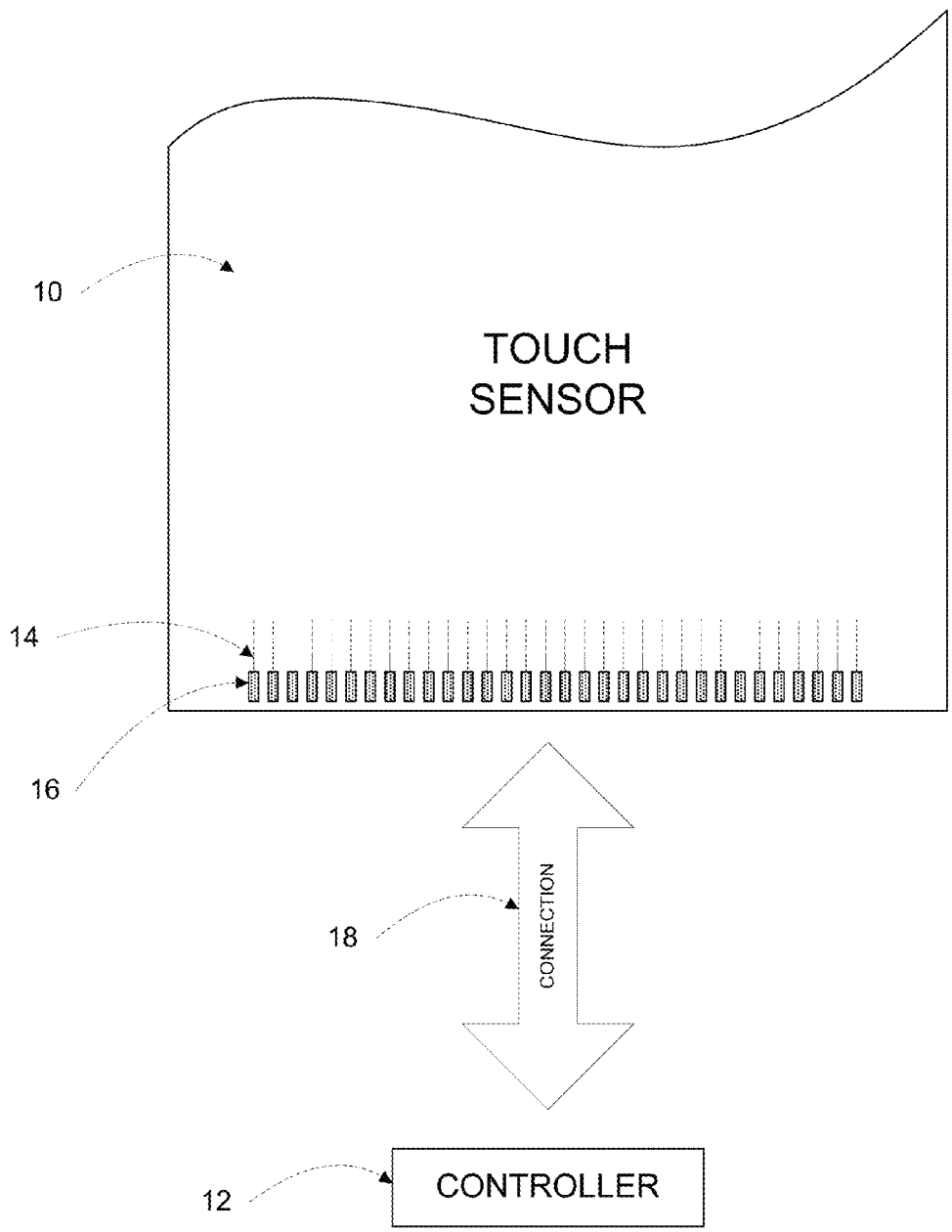
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 1% to approximately 10% of the area of its shape in a hatched, mesh, or other suitable pattern. Herein, reference to FLM encompasses such material, where appropriate. In particular embodiments, the percentage of FLM that covers a particular area may be referred to as a metal density. The fine lines of conductive material may be opaque or substantially reflective, and in particular embodiments, the combined optical transmissivity of electrodes formed using a conductive mesh may be approximately 90% or higher, ignoring a reduction in transmittance due to other factors such as the substrate material. Thus, the contribution of the fine lines of conductive material to the attenuation of light through the conductive mesh may be within a range of approximately 1% to approximately 10%. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection. Additionally, when overlaid over a display, one or more micro-features of the touch sensor (e.g., a touch-sensor mesh pattern, as described below) may, at least in part, determine an amount or a characteristic of a moiré-pattern effect exhibited by the touch sensor-display combination. In particular embodiments, a moiré pattern refers to a secondary and visually evident superimposed pattern that can result from a touch-sensor mesh pattern being overlaid over a repeating pixel pattern of a display. A moiré pattern may result in a waviness or a periodic spatial variation in the brightness of an image produced by a display. In particular embodiments, certain touch-sensor mesh patterns, such as for example the mesh patterns described and illustrated below, may exhibit a reduced amount of brightness variation associated with moiré-pattern effects. In particular embodiments, the reduction of moiré-pattern effects associated with a touch-sensor mesh pattern may be referred to as an improvement in optical performance of the mesh pattern.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
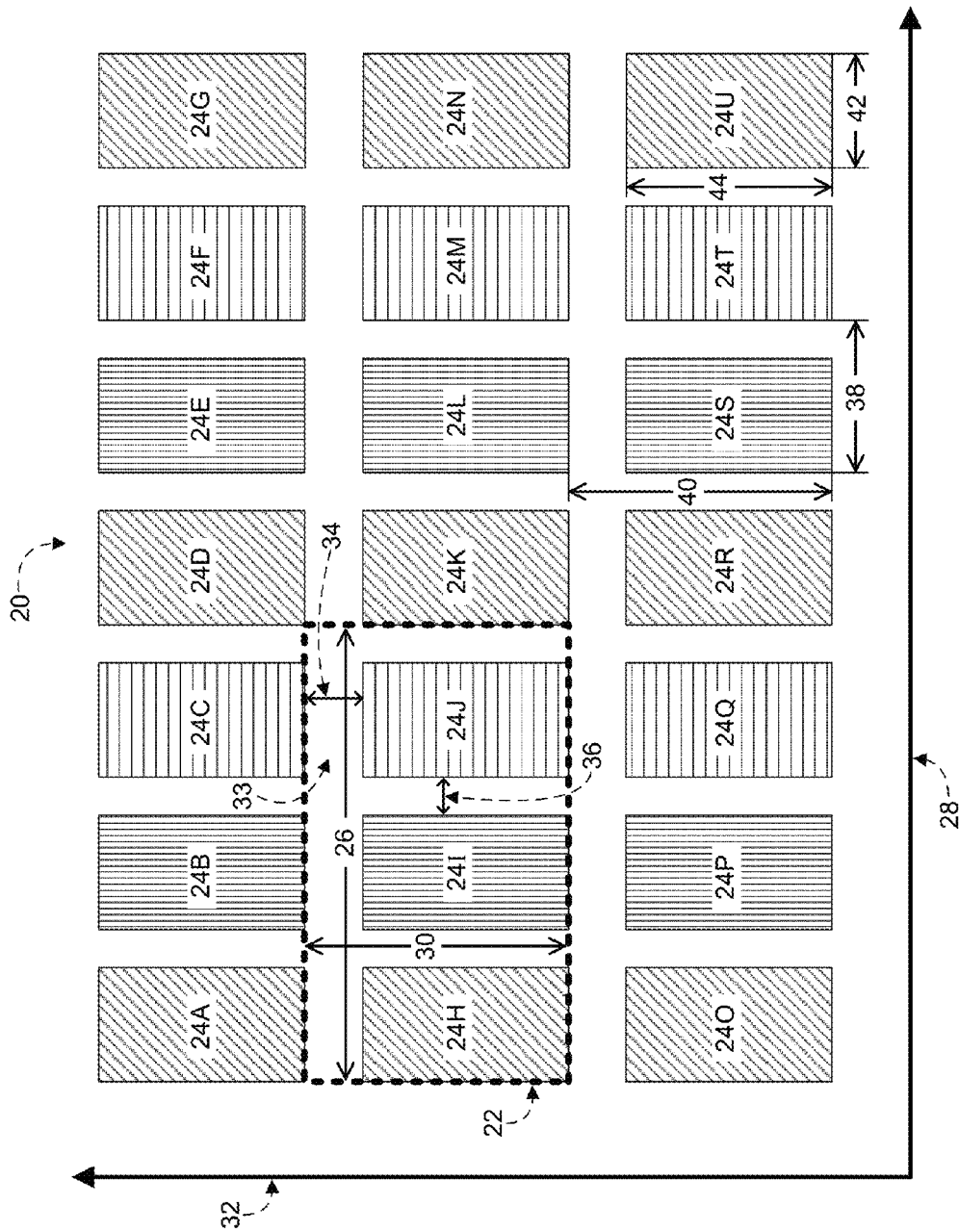
FIG. 2 illustrates an example portion of an example display that includes example pixels and sub-pixels.

FIG. 2 illustrates an example portion 20 of an example display that includes example pixels 22 and sub-pixels 24. A touch sensor may be overlaid on the display to implement a touch-sensitive display device. As an example and not by way of limitation, the display underneath the touch sensor may be a liquid crystal display (LCD), a light-emitting diode (LED) display, an organic LED display, an LED backlight LCD, an electrophoretic display, a plasma display, or other suitable display. Although this disclosure describes and illustrates particular display types, this disclosure contemplates any suitable display types.

Portion 20 includes an array of pixels 22. In the example of FIG. 2, each pixel 22 includes three sub-pixels 24. In particular embodiments, each sub-pixel 24 may correspond to a particular color, such as for example red, green, or blue. The area of a pixel 22 (which may include dead space as discussed below) is indicated by the dashed-line border that encompasses sub-pixels 24H, 24I, and 24J in FIG. 2, where each sub-pixel may correspond to the color red, green, or blue, respectively. The combined output of sub-pixels 24 determines the color and intensity of each pixel 22. Although this disclosure describes and illustrates example pixels 22 with a particular number of sub-pixels 24 having particular colors, this disclosure contemplates any suitable pixels with any suitable number of sub-pixels having any suitable colors.

Pixels 22 and sub-pixels 24 may be arranged in a repeating pattern along a horizontal axis 28 and a vertical axis 32 that are substantially perpendicular to each other. In particular embodiments, horizontal axis 28 may be referred to as an x-axis or a first axis, and vertical axis 32 may be referred to as a y-axis or a second axis. Although this disclosure describes and illustrates horizontal and vertical axes, this disclosure contemplates any suitable axes having any suitable orientation. Moreover, although this disclosure describes and illustrates particular axes having particular orientations relative to one another, this disclosure contemplates any suitable axes having any suitable orientation relative to one another.

Each pixel 22 has a horizontal pixel pitch 26, which in particular embodiments may be defined as the distance between corresponding features of two adjacent pixels 22 along horizontal axis 28 (such as the distance from the left edge of sub-pixel 24H to the left edge of sub-pixel 24K). Each pixel 22 also has a vertical pixel pitch 30, which in particular embodiments may be defined as the distance between corresponding features of two adjacent pixels along vertical axis 32 (such as the distance from the lower edge of sub-pixel 24I to the lower edge of sub-pixel 24B). In particular embodiments, horizontal pixel pitch 26 may be referred to as HPP or $PP_x$, and vertical pixel pitch 30 may be referred to as VPP or $PP_y$. In particular embodiments, horizontal pixel pitch 26 may be referred to as a pixel width or the width of pixel 22, and vertical pixel pitch 30 may be referred to as a pixel height or the height of pixel 22. This disclosure contemplates any suitable pixels with any suitable horizontal and vertical pixel pitches having any suitable values.

Pixel 22 and sub-pixel 24 may have a substantially rectangular shape, as illustrated in FIG. 2. Pixel 22 and sub-pixel 24 may have other suitable shapes, including but not limited to square, round, oval, or chevron-shaped. In particular embodiments, horizontal pixel pitch 26 may be approximately 50 μm, 100 μm, 150 μm, 200 μm, 250 μm, 300 μm, or any suitable dimension. In particular embodiments, vertical pixel pitch 30 may be approximately 50 μm, 100 μm, 150 μm, 200 μm, 250 μm, 300 μm, or any suitable dimension. In particular embodiments, horizontal pixel pitch 26 may be approximately the same as vertical pixel pitch 30, and pixel 22 may have a substantially square shape. In particular embodiments, pixel 22 having a substantially square shape may refer to horizontal pixel pitch 26 and vertical pixel pitch 26 having approximately the same dimension to within 1%, 2%, 5%, or to within any suitable percentage. As an example and not by way of limitation, a display may include pixels 22 with horizontal pixel pitch 26 and vertical pixel pitch 30 equal to 100 μm±1%, and pixels 22 may have a square shape with a 100-μm±1-μm height and a 100-μm±1-μm width. As another example and not by way of limitation, a display may have pixels 22 with horizontal pixel pitch 26 and vertical pixel pitch 30 approximately equal to 250 μm±2%, and pixels 22 may have a square shape with a height and width of 250 μm±5 μm. As another example and not by way of limitation, a display may include pixels 22 that are substantially square with a horizontal pixel pitch 26 of 99-μm±2-μm and a vertical pixel pitch 30 of 101-μm±2-μm. Although this disclosure describes and illustrates particular pixels having particular dimensions and particular pixel pitches, this disclosure contemplates any suitable pixels having any suitable dimensions and any suitable pixel pitches.

Each pixel 22 may also include dead space 33, which corresponds to regions of pixel 22 not occupied by a sub-pixel 24. In particular embodiments, sub-pixel 24 may include a color element that emits a particular color (e.g., red, green, or blue), and sub-pixel 24 may be separated from adjacent sub-pixels 24 by dead space 33. In particular embodiments, dead space 33 may include circuitry (e.g., conductive traces, wiring, drive transistors, or any suitable other electronic components) associated with providing a drive current or voltage to a color-emitting element of sub-pixel 24. In particular embodiments, dead space 33 has a height (DSH) 34 that may be defined as the distance between adjacent sub-pixels 24 along vertical axis 32 (such as the distance between the top edge of sub-pixel 24J and the bottom edge of sub-pixel 24C in FIG. 2). In particular embodiments, dead space 33 has a width (DSW) 36 that may be defined as the distance between adjacent sub-pixels 24 along horizontal axis 28 (such as the distance between the right edge of sub-pixel 24I and the left edge of sub-pixel 24J). This disclosure contemplates any suitable pixels with any suitable dead space having any suitable dimensions.

Each sub-pixel 24 has a horizontal sub-pixel pitch 38, which may be defined in particular embodiments as the distance between corresponding features of two adjacent sub-pixels along horizontal axis 28, including width 36 of dead space 33 (such as the distance between the left edges of sub-pixels 24S and 24T in FIG. 2). Each sub-pixel 24 also has a vertical sub-pixel pitch 40, which may be defined in particular embodiments as the distance between corresponding features of two adjacent sub-pixels along vertical axis 32, including height 34 of dead space 33 (such as the distance between the lower edges of sub-pixels 24S and 24L). In particular embodiments, horizontal sub-pixel pitch 38 may be referred to as HSPP or $SPP_x$, and vertical sub-pixel pitch 40 may be referred to as VSPP or $SPP_y$. In particular embodiments, horizontal pixel pitch 26 is equal to three times horizontal sub-pixel pitch 38, so that $PP_x=3\times SPP_x$, or $$SPP_x = \frac{1}{3} \times PP_x.$$

In particular embodiments, vertical pixel pitch 30 is equal to vertical sub-pixel pitch 40.

Each sub-pixel 24 has a sub-pixel width (referred to as SPW or $SPD_x$) 42, which may be defined in particular embodiments as the sub-pixel dimension along horizontal axis 28 (such as the distance between the left and right edges of sub-pixel 24U in FIG. 2). In particular embodiments, $SPD_x$ 42 may be referred to as a distance between opposing edges of the color element of sub-pixel 24 along horizontal axis 28. Each sub-pixel 24 also has a sub-pixel height (referred to as SPH or $SPD_y$) 44, which may be defined in particular embodiments as the sub-pixel dimension along vertical axis 32 (such as the distance between the lower and upper edges of sub-pixel 24U). In particular embodiments, $SPD_y$ 44 may be referred to as a distance between opposing edges of the color element of sub-pixel 24 along vertical axis 32. In the example of FIG. 2, horizontal pixel pitch 26 is equal to three times horizontal sub-pixel pitch 38, and horizontal sub-pixel pitch 38 is equal to the sum of $SPD_x$ 42 and DSW 36. In the example of FIG. 2, vertical sub-pixel pitch 40 is equal to vertical pixel pitch 30, and vertical pixel pitch 30 is equal to the sum of $SPD_y$ 44 and DSH 34. In particular embodiments, each pixel 22 may include three sub-pixels 24, and each sub-pixel 24 may have approximately the same dimensions, $SPD_x$ 42 and $SPD_y$ 44.

In particular embodiments, pixel 22 may have a substantially square shape so that $PP_x \cong PP_y$. As an example and not by way of limitation, pixel 22 may have a square shape with height and width of approximately 150 μm. Such a 150-μm square pixel 22 may have a $SPP_x$ 38 of approximately 50 μm since $$SPP_x = \frac{1}{3} \times PP_x = \frac{1}{3} \times (150 \text{ μm}) = 50 \text{ μm}.$$

Moreover, $SPD_x$ 42 may be approximately 42 μm, and DSW 36 may be approximately 8 μm, which corresponds to a $SPP_x$ 38 of 50 μm. Similarly, $SPD_y$ 44 may be approximately 140 μm, and DSH 34 may be approximately 10 μm, which corresponds to a vertical pixel pitch 30, or pixel height, of 150 μm. Although this disclosure describes and illustrates particular pixels and sub-pixels having particular shapes, arrangements, and dimensions, this disclosure contemplates any suitable arrangement of any suitable pixels and sub-pixels having any suitable shapes and dimensions. Moreover, although this disclosure describes and illustrates particular pixels and sub-pixels having particular pitches and dimensions, this disclosure contemplates any suitable pixels and sub-pixels having any suitable pitches and dimensions.

Figure 3:
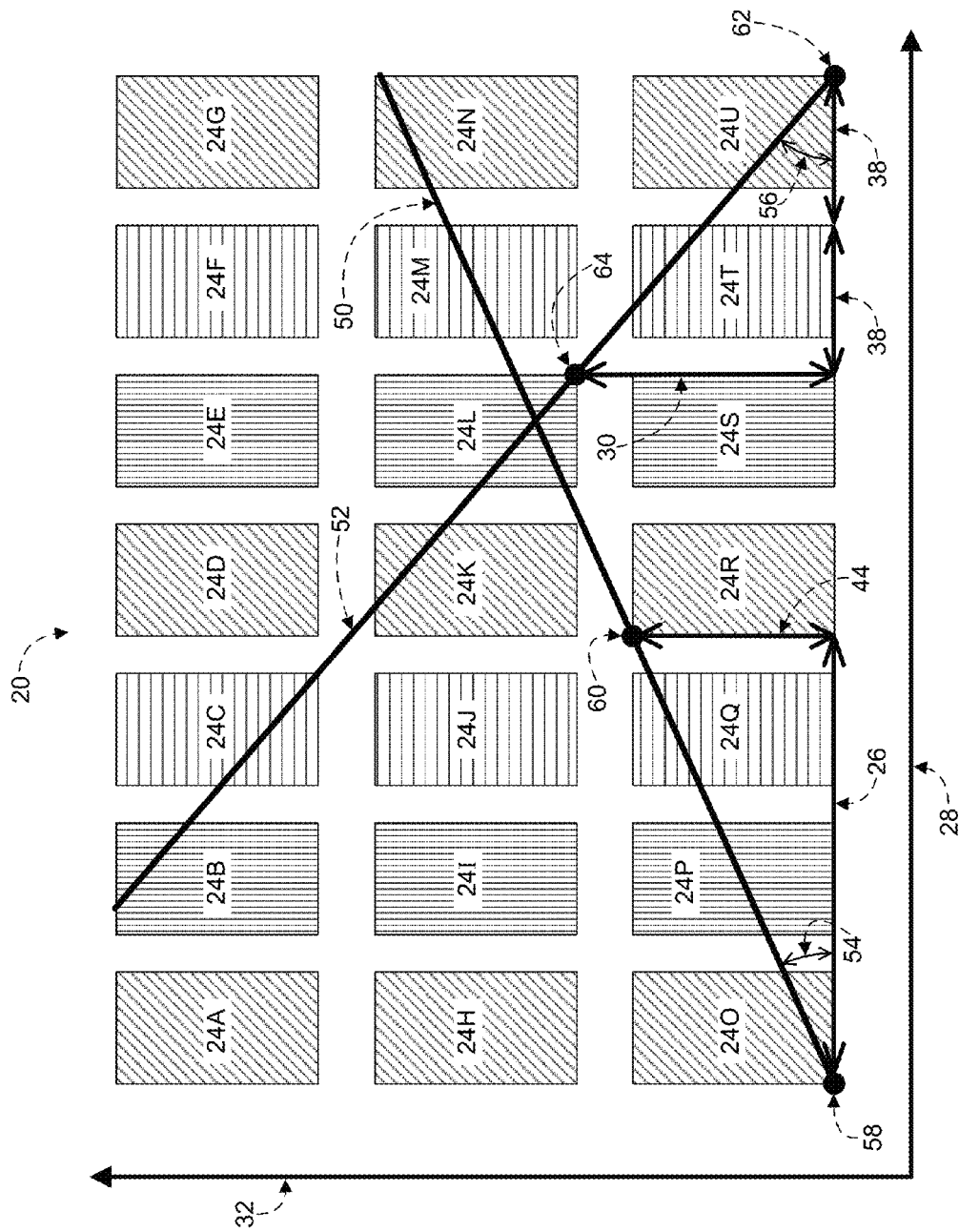
FIG. 3 illustrates the example display portion of FIG. 2 with example conductive lines overlying the display portion.

FIG. 3 illustrates the example display portion 20 of FIG. 2 with example conductive lines 50 and 52 overlying the display portion 20. Conductive lines 50 and 52 may be FLM and may make up part of a mesh pattern of an electrode of a touch sensor. In particular embodiments, an arrangement of conductive lines may be referred to as a mesh pattern or a mesh design. Although this disclosure describes and illustrates a touch sensor overlying a display, this disclosure contemplates suitable portions of a touch sensor (including suitable portions of conductive lines 50 and 52) being disposed on one or more layers on or within a display stack of the display, where appropriate.

In the example of FIG. 3, conductive line 50 is oriented at an angle 54 ($\theta_{54}$) relative to horizontal axis 28, and conductive line 52 is oriented at an angle 56 ($\theta_{56}$) relative to horizontal axis 28. Angle 54 of conductive line 50 can be illustrated by drawing a line that passes through reference points 58 and 60, where reference point 58 is located at the lower left corner of sub-pixel 24O and reference point 60 is located at the upper left corner of sub-pixel 24R. The slope of conductive line 50 may be defined as the vertical rise of conductive line 50 divided by the horizontal run of conductive line 50, and angle 54 can be found from the arctangent of that slope. In the example of FIG. 3, the vertical rise of conductive line 50 is $SPD_y$ 44, and the horizontal run of conductive line 50 is $PP_x$ 26. Thus, the slope of conductive line 50 equals $$\left(\frac{SPD_y}{PP_x}\right),$$

and angle 34 can be found from the expression $$\theta_{54} = \arctan\left(\frac{SPD_y}{PP_x}\right).$$

In FIG. 3, the vertical rise of conductive line 50 can also be expressed as $(PP_y-DSH)$, in which case the slope of conductive line 50 can be written $$\left(\frac{PP_y - DSH}{PP_x}\right),$$

and angle 54 can be found from the expression $$\theta_{54} = \arctan\left(\frac{PP_y - DSH}{PP_x}\right).$$

In the example of FIG. 3, angle 56 of conductive line 52 can be illustrated by drawing a line that passes through reference points 62 and 64, where reference point 62 is located at the lower right corner of sub-pixel 24U and reference point 64 is located at the lower right corner of sub-pixel 24L. The slope of conductive line 52 may be defined as the vertical rise of conductive line 52 divided by the horizontal run of conductive line 52, and angle 56 can be found from the arctangent of that slope. In the example of FIG. 3, the vertical rise of conductive line 52 is $PP_y$ 30, and the horizontal run of conductive line 52 is two times $SPP_x$ 38. Thus, the slope of conductive line 52 equals $$\left(\frac{PP_y}{2 \times SPP_x}\right),$$

and angle 56 can be found from the expression $$\theta_{56} = \arctan\left(\frac{PP_y}{2 \times SPP_x}\right).$$

In FIG. 3, the horizontal run of conductive line 52 can also be expressed as $$\frac{2}{3}PP_x,$$

in which case the slope of conductive line 52 can be written $$\left(\frac{PP_y}{\frac{2}{3}PP_x}\right),$$

and angle 56 can be found from the expression $$\theta_{56} = \arctan\left(\frac{3PP_y}{2PP_x}\right).$$

In particular embodiments, conductive lines 50 and 52 may make up part of a mesh pattern of a touch sensor and angles $\theta_{54}$ and $\theta_{56}$ may vary by up to 0.2°, 0.5°, 1°, or any suitable angular amount from the values calculated in the expressions above without substantially degrading the optical performance of the mesh pattern. Angles $\theta_{54}$ and $\theta_{56}$ of conductive lines 50 and 52, respectively, in FIGS. 4-20 (which are described below) may similarly vary. As an example and not by way of limitation, display portion 20 in FIG. 3 may have substantially square pixels 22 with height and width of approximately 100 μm so that $PP_x \cong PP_y \cong 100$ μm. Additionally, display portion 20 may have a $SPP_x$ 38 of approximately 33.3 μm, and a $SPD_y$ of approximately 84 μm. For such an example display portion 20, angle 54 of conductive line 50 is $$\theta_{54} = \arctan\left(\frac{SPD_y}{PP_x}\right) = \arctan\left(\frac{84}{100}\right) \cong 40.0°,$$

and angle 56 of conductive line 52 is $$\theta_{56} = \arctan\left(\frac{PP_y}{2 \times SPP_x}\right) = \arctan\left(\frac{100}{2 \times 33.3}\right) \cong 56.3°.$$

As an example and not by way of limitation, a mesh pattern may include conductive lines 50 with angle 54 that is within 1° of 40.0°, so that angle 54 for conductive lines 50 may be between 39.0° and 41.0°. As another example and not by way of limitation, a mesh pattern may include conductive lines 52 with angle 56 that is within 1.0° of 56.3°, so that angle 56 may be between 55.3° and 57.3°. Although this disclosure describes and illustrates particular conductive lines having particular angles with respect to a particular axis of a display, this disclosure contemplates any suitable conductive line having any suitable angle with respect to any suitable axis of a display.

In the example of FIG. 3, conductive line 50 is oriented counterclockwise at angle 54 relative to horizontal axis 28, and conductive line 52 is oriented clockwise at angle 56 relative to horizontal axis 28. In particular embodiments, a mesh design may include two sets of conductive lines, where the first set includes conductive lines that are substantially parallel and have a counterclockwise orientation with respect to horizontal axis 28 at an angle 54, and the second set includes conductive lines that are substantially parallel and have a clockwise orientation with respect to horizontal axis 28 at an angle 56. In particular embodiments, conductive line 50 may be oriented clockwise at angle 54 relative to horizontal axis 28, and conductive line 52 may be oriented counterclockwise at angle 56 relative to horizontal axis 28. In particular embodiments, conductive line 50 may be oriented clockwise or counterclockwise at angle 54 relative to horizontal axis 28, and conductive line 52 may be oriented clockwise or counterclockwise at angle 56 relative to horizontal axis 28. Although this disclosure describes and illustrates example conductive lines 50 and 52 having particular orientations relative to horizontal axis 28, this disclosure contemplates any suitable clockwise or counterclockwise orientation of conductive lines relative to any suitable axis. As described above, in particular embodiments, angles 54 and 56 may vary by up to approximately 1° from the values calculated in the expressions above without substantially degrading the optical performance of the mesh pattern. Such rotation of up to approximately 1° may occur during a manufacturing or assembly process (as an intentional design feature, or as an incidental result of routine process variations), for example. Similarly, a mesh pattern made up of conductive lines 50 and 52 in any of FIGS. 4-20 described below may have conductive lines 50 and 52 with any suitable clockwise or counterclockwise rotational orientation and a variation of angles 54 and 56 of up to approximately 1°.

In the example of FIG. 3 (and FIGS. 4-20 described below), reference points 58, 60, 62, and 64 do not correspond to any conductive or other material of a touch sensor. Instead, reference points 58, 60, 62, and 64 are used as a basis to determine angles 54 and 56 of a mesh pattern. Moreover, in the example of FIG. 3 (and FIGS. 4-20 described below) reference points 58, 60, 62, and 64 are intended as a guide to illustrating or constructing angles 54 and 56, and reference points 58, 60, 62, and 64 are not constrained to be located only at particular locations such as lower-left or lower right corners of particular sub-pixels 24. As an example and not by way of limitation, reference points 58, 60, 62, and 64 may be referenced to any suitable locations, such as for example, a corner, an edge, or a center of particular pixels 22, sub-pixels 24, or regions of dead space 33. Similarly, conductive lines 50 and 52 are not constrained to pass through any particular reference points (e.g., 58, 60, 62, or 64); rather, conductive lines 50 and 52 are at least in part characterized by their angles, 54 and 56, respectively, with respect to horizontal axis 28. In particular embodiments, conductive lines 50 and 52 need not be constrained to pass through any particular reference points but may be displaced along horizontal axis 28 and vertical axis 32 by any suitable amount. Additionally, a mesh pattern that includes conductive lines 50 and 52 may be displaced horizontally, vertically, or both relative to pixels 22 or sub-pixels 24 (as may occur during a manufacturing process) without substantially degrading the optical performance of the mesh pattern. A mesh pattern made up of conductive lines 50 and 52 in any of FIGS. 4-20 described below may similarly have any suitable alignment or displacement relative to pixels 22 or sub-pixels 24 of a display. Although this disclosure describes and illustrates particular conductive lines having particular angles, this disclosure contemplates any suitable conductive lines having any suitable angles. Moreover, although this disclosure describes and illustrates particular conductive lines having particular angles defined by particular reference points, this disclosure contemplates any suitable conductive lines having any suitable angles defined by any suitable reference points.

Figure 4:
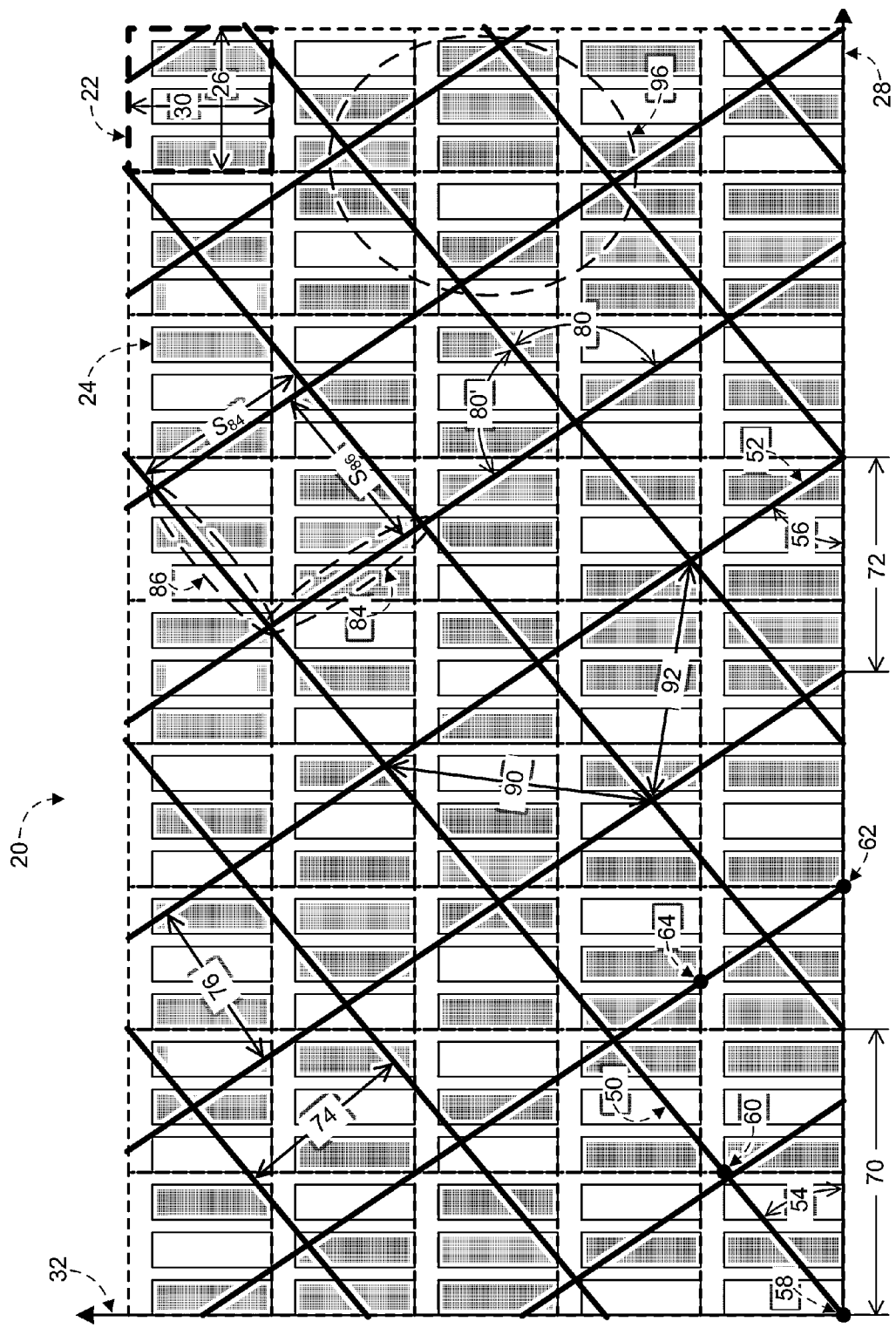
FIGS. 4-5 illustrate example mesh designs overlying other example portions of example displays.
Figure 5:
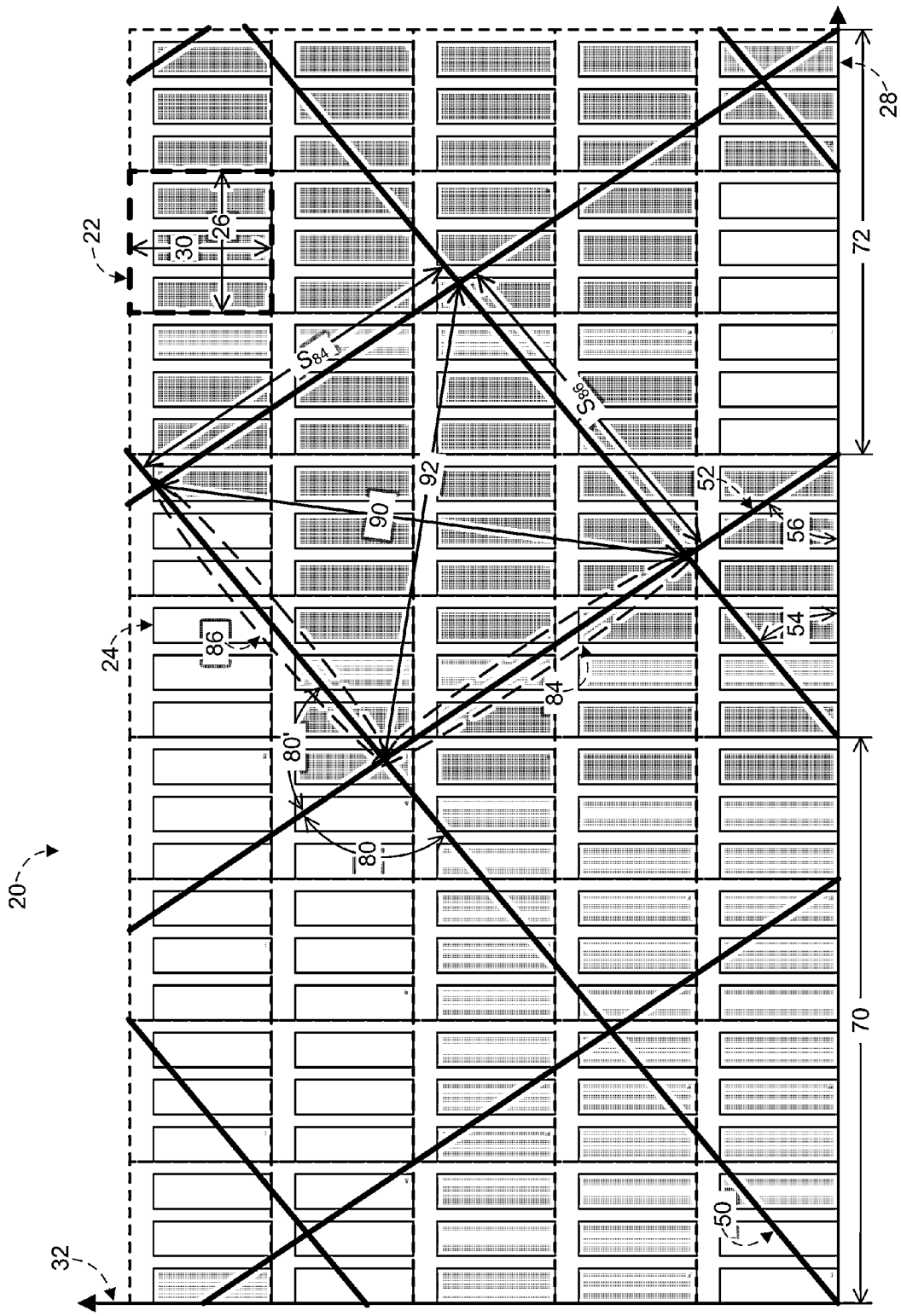

FIGS. 4-5 illustrate example mesh designs overlying other example portions 20 of example displays. Display portions 20 include pixels 22 arranged along horizontal axis 28 and vertical axis 32. In FIGS. 4-5 (and FIGS. 7-20 which are described below), each pixel 22 has horizontal pixel pitch 26 ($PP_x$) and vertical pixel pitch 30 ($PP_y$), and each pixel 22 includes three sub-pixels 24. Pixels 22 in FIGS. 4-5 are substantially square so that $PP_x$ and $PP_y$ are approximately the same. The example mesh designs in FIGS. 4-5 (and FIGS. 6-20 described below) include conductive lines 50 and 52, and conductive lines 50 and 52 may be FLM and may make up part of a mesh pattern of an electrode of a touch sensor.

Conductive lines 50 in each of FIGS. 4-5 are substantially parallel to each other, and each conductive line 50 forms an angle 54 relative to horizontal axis 28. Additionally, conductive lines 50 in each of FIGS. 4-5 are substantially evenly spaced from one another with adjacent conductive lines 50 having an equal horizontal separation distance 70 along horizontal axis 28. Conductive lines 52 in FIGS. 4-5 are also substantially parallel to each other, forming an angle 56 relative to horizontal axis 28. Conductive lines 52 are also substantially evenly spaced from one another with adjacent conductive lines 52 having an equal horizontal separation distance 72. In particular embodiments, horizontal separation distance 70 refers to a distance between adjacent conductive lines 50 as measured along horizontal axis 28. Similarly, in particular embodiments, horizontal separation distance 72 refers to a distance between adjacent conductive lines 52 as measured along horizontal axis 28. In particular embodiments, horizontal separation distances 70 and 72 may be referred to as separation distances, line separation distances, horizontal line-separation distances, or line spacings.

In particular embodiments, conductive lines 50 have a horizontal separation distance 70 along horizontal axis 28 that may be expressed as $D_{70}=k \times PP_x$, where $D_{70}$ is horizontal separation distance 70 of conductive lines 50, k is a positive integer, and $PP_x$ is horizontal pixel pitch 26. In particular embodiments, k may be referred to as a line-separation parameter. Similarly, in particular embodiments, conductive lines 52 have a horizontal separation distance 72 along horizontal axis that may be expressed as $$D_{72} = \frac{3}{4} \times k \times PP_x,$$

where $D_{72}$ is horizontal separation distance 72 of conductive lines 52 and k is the same positive integer used to determine $D_{70}$. In the example of FIG. 4, the line-separation parameter k equals 2, which gives a horizontal separation distance 70 of $D_{70}=2 \times PP_x$, and a horizontal separation distance 72 of $$D_{72} = \frac{3}{2} \times PP_x.$$

In particular embodiments, a perpendicular separation distance 74 between conductive lines 50 is measured in the direction perpendicular to conductive lines 50. Perpendicular separation distance 74 is related to horizontal separation distance 70 by the expression $D_{74}=D_{70} \sin \theta_{54}$, where $D_{74}$ is perpendicular separation distance 74. Similarly, in particular embodiments, a perpendicular separation distance 76 between conductive lines 52 is measured in the direction perpendicular to conductive lines 52. Perpendicular separation distance 76 is related to horizontal separation distance 72 by the expression $D_{76}=D_{72} \sin \theta_{56}$, where $D_{76}$ is perpendicular separation distance 76. In FIG. 4, perpendicular separation distance 74 equals $2PP_x \sin \theta_{54}$, and perpendicular separation distance 76 equals $$\frac{3}{2} PP_x \sin \theta_{56}.$$

In FIG. 4, angle 80 ($\theta_{80}$) may be referred to as an angle between conductive lines 50 and 52, and angle 80 equals the sum of angles 54 and 56, or $\theta_{80}=\theta_{54}+\theta_{56}$. In FIG. 4, angle 80' ($\theta'_{80}$) is another angle between conductive lines 50 and 52, and angle 80' is the supplement to angle 80, so that angle 80' is $180°-\theta_{80}$. In particular embodiments, line segment 84 represents a length of conductive line 52 between two adjacent conductive lines 50. Line segment 84 has length $S_{84}$ that is related to horizontal separation distance 70 by the expression $$S_{84} = D_{70} \times \frac{\sin\theta_{54}}{\sin\theta_{80}}.$$

Similarly, in particular embodiments, line segment 86 represents a length of conductive line 50 between two adjacent conductive lines 52. Line segment 86 has length $S_{86}$ that is related to horizontal separation distance 72 by the expression $$S_{86} = D_{72} \times \frac{\sin\theta_{56}}{\sin\theta_{80}}.$$

In FIG. 4, a mesh cell 96 may include two adjacent line segments 84 and two adjacent line segments 86 that together form a four-sided shape, such as for example a parallelogram or a quadrilateral. Although this disclosure describes and illustrates particular mesh cells that include a particular number of line segments, this disclosure contemplates any suitable mesh cells that include any suitable number of line segments. In FIG. 4, diagonal length 90 is the distance between the two opposite vertices of mesh cell 96 that represent the vertical extent of the mesh cell. Similarly, diagonal length 92 is the distance between the other two opposite vertices of mesh cell 96 that represent the horizontal extent of the mesh cell. In particular embodiments, diagonal length 90 may be referred to as a vertical diagonal length, and diagonal length 92 may be referred to as a horizontal diagonal length. Diagonal length 90 ($D_{90}$) may be found from the expression $D_{90}^2=S_{84}^2+S_{86}^2-2S_{84}S_{86}\cos\theta_{80}$, and diagonal length 92 ($D_{92}$) may be found from the expression $D_{92}^2=S_{84}^2+S_{86}^2-2S_{84}S_{86}\cos\theta'_{80}$.

As an example and not by way of limitation, display portion 20 in FIG. 4 may have substantially square pixels 22 with height and width of approximately 170 µm so that $PP_y \cong PP_y \cong 170$ µm. Additionally, such a 170-µm square pixel 22 may have a $SPP_x$ 38 of approximately 56.7 µm, and a $SPD_y$ of approximately 155 µm. For such an example display portion 20, angle 54 of conductive line 50 is $$\theta_{54} = \arctan\left(\frac{SPD_y}{PP_x}\right) = \arctan\left(\frac{155}{170}\right) \cong 42.4°,$$

and angle 56 of conductive line 52 is $$\theta_{56} = \arctan\left(\frac{PP_y}{2 \times SPP_x}\right) = \arctan\left(\frac{170}{2 \times 56.7}\right) \cong 56.3°.$$

In FIG. 4, for pixel pitches $PP_x \cong PP_y \cong 170$ µm, horizontal separation distance 70 is approximately $D_{70}=2\times(170$ µm), or 340 µm, and horizontal separation distance 72 is approximately $$D_{72} = \frac{3}{2} \times (170 \text{ µm}),$$

or 255 µm. Additionally, perpendicular separation distance 74 is $D_{74}=D_{70} \sin\theta_{54}=(340$ µm$)\times\sin(42.4°)\cong229.3$ µm, and perpendicular separation distance 76 is $D_{76}=D_{72} \sin\theta_{56}=(255$ µm$)\times\sin(56.3°)\cong212.1$ µm. Angle 80 is approximately 42.4°+56.3°=98.7°, and angle 80' is approximately 81.3°. Moreover, length of line segment 84 is $$S_{84} = D_{70} \times \frac{\sin\theta_{54}}{\sin\theta_{80}} \cong (340 \text{ µm}) \times \frac{\sin 42.4°}{\sin 81.3°} \cong 231.9 \text{ µm},$$

and length of line segment 86 is $$S_{86} = D_{72} \times \frac{\sin\theta_{56}}{\sin\theta_{80}} \cong (255 \text{ µm}) \times \frac{\sin 56.3°}{\sin 81.3°} \cong 214.6 \text{ µm}.$$

From the expressions above for diagonal lengths 90 and 92, diagonal length 90 is approximately $D_{90} \cong 338.9$ µm, and diagonal length 92 is approximately $D_{92} \cong 291.2$ µm.

In particular embodiments, horizontal separation distances 70 and 72, perpendicular separation distances 74 and 76, line segment lengths $S_{84}$ and $S_{86}$, or diagonal lengths 90 and 92 may vary by up to 0.5%, 1%, 2%, 3%, or by any suitable percentage. In particular embodiments, such variation in distance or length may occur during a manufacturing process. As an example and not by way of limitation, for a 1% variation in horizontal separation distances, horizontal separation distance 70 in FIG. 4 may be expressed as 340 µm±1%, or 340 µm±3.4 µm, and horizontal separation distance 72 may be expressed as 255 µm±1%, or 255 µm±2.55 µm. In particular embodiments, horizontal separation distance 70 may be referred to as being within 1% of 340 µm, and horizontal separation distance 72 may be referred to as being within 1% of 255 µm. Although this disclosure describes and illustrates particular mesh patterns having particular horizontal separation distances and particular variation of horizontal separation distances, this disclosure contemplates any suitable mesh patterns having any suitable horizontal separation distances and any suitable variation of horizontal separation distances.

FIG. 5 illustrates another example mesh design overlying another example portion 20 of an example display. In the example of FIG. 5, the line-separation parameter k equals 4, which gives a horizontal separation distance 70 of $D_{70}=4\times PP_x$ and a horizontal separation distance 72 of $D_{72}=3\times PP_x$. Conductive lines 50 have a horizontal separation distance 70 along horizontal axis 28 that is substantially equal to four times horizontal pixel pitch 26, and conductive lines 52 have a horizontal separation distance 72 along horizontal axis 28 that is substantially equal to three times horizontal pixel pitch 26. As an example and not by way of limitation, pixels 22 in FIG. 5 may be substantially square with height and width of approximately 80 µm so that $PP_x \cong PP_y \cong 80$ µm. In FIG. 5, angle 54 is approximately 41.9°, and angle 56 is approximately 56.3°. Angle 80 is approximately 98.2°, and angle 80' is approximately 81.8°. In FIG. 5, horizontal separation distance 70 is approximately $D_{70}=4\times(80$ µm), or 320 µm, and horizontal separation distance 72 is approximately $D_{72}=3\times(80$ µm), or 240 µm. From the expressions above for segment lengths, segment length $S_{84}$ is approximately 215.9 µm, and segment length $S_{86}$ is approximately 201.7 µm. From the expressions above for diagonal lengths 90 and 92, diagonal length 90 is approximately $D_{90} \cong 315.8$ µm, and diagonal length 92 is approximately $D_{92} \cong 273.7$ µm.

In particular embodiments, the mesh design of FIG. 4 with k=2 may be preferable for a display where $PP_x$ and $PP_y$ are on the order of approximately 160 µm to 200 µm. In particular embodiments, the mesh design of FIG. 5 with k=4 may be preferable for a display where $PP_x$ and $PP_y$ are on the order of approximately 80 µm to 100 µm. In particular embodiments, it may be preferable for a mesh design to have diagonal lengths 90 and 92 in the range of approximately 265-340 µm. As an example and not by way of limitation, a mesh design with diagonal lengths 90 and 92 in the range of approximately 265-340 µm may have a metal density of approximately 3% to 5% for conductive lines 50 and 52 with widths of approximately 5 µm. Such an example mesh design may block approximately 3% to 5% of incident light, such as for example, light emitted by a display positioned below the mesh. In particular embodiments, a mesh design with diagonal lengths 90 and 92 of less than 340 µm may be associated with a mesh having a line density sufficiently high so as to be difficult to resolve the lines visually with the human eye. In particular embodiments, line density refers to a density of conductive lines and is equal to the reciprocal of perpendicular separation distance 74 or 76. As an example and not by way of limitation, conductive lines 50 with a perpendicular separation distance 74 of approximately 240 µm, which may be associated with a mesh having a diagonal length 90 or 92 of approximately 340 µm, may be referred to as having a line density of approximately 1/240 µm≅4.2 lines per millimeter. Although this disclosure describes and illustrates particular mesh patterns having particular mesh cells with particular diagonal lengths, this disclosure contemplates any suitable mesh patterns having any suitable mesh cells with any suitable diagonal lengths. Moreover, although this disclosure describes and illustrates particular mesh patterns having particular line-separation parameters (k), this disclosure contemplates any suitable mesh pattern having any suitable line-separation parameter.

In particular embodiments, conductive lines 50 and 52 are substantially straight lines. In addition or as an alternative, in particular embodiments, non-linear conductive line patterns may be used to avoid long linear stretches of conductive metal with a repeat frequency, which non-linear patterns may reduce the appearance of optical interference or moiré patterns. In particular embodiments, one or more segments of one or more conductive lines 50 and 52 may have a variation in line direction or path from a straight line, including but not limited to, wavy, sinusoidal, or zig-zag lines. As an example and not by way of limitation, one or more segments of one or more conductive lines 50 and 52 may be substantially sinusoidal. In particular embodiments, conductive lines 50 and 52 may have a sinusoidal variation with a peak-to-peak amplitude between 0% and 10% of horizontal separation distance 70 or 72. As an example and not by way of limitation, a mesh pattern with a horizontal separation distance 70 of approximately 300 µm may have conductive lines 50 or 52 with a peak-to-peak sinusoidal amplitude between 0 µm and 30 µm. Additionally, in particular embodiments, conductive lines 50 may have a sinusoidal variation with a period on the order of $S_{86}$. Similarly, in particular embodiments, conductive lines 52 may have a sinusoidal variation with a period on the order of $S_{84}$. In particular embodiments, conductive lines 50 and 52 that include segments that are non-linear may have horizontal line separation distances 70 and 72 that may be determined based on an average horizontal line separation distance or based on a horizontal line separation distance between linear approximations to non-linear line segments. Although this disclosure describes and illustrates particular meshes that have particular conductive lines 50 and 52 with particular curves (e.g., substantially straight or substantially sinusoidal), this disclosure contemplates any suitable meshes that have any suitable conductive lines with any suitable curves.

Figure 6:
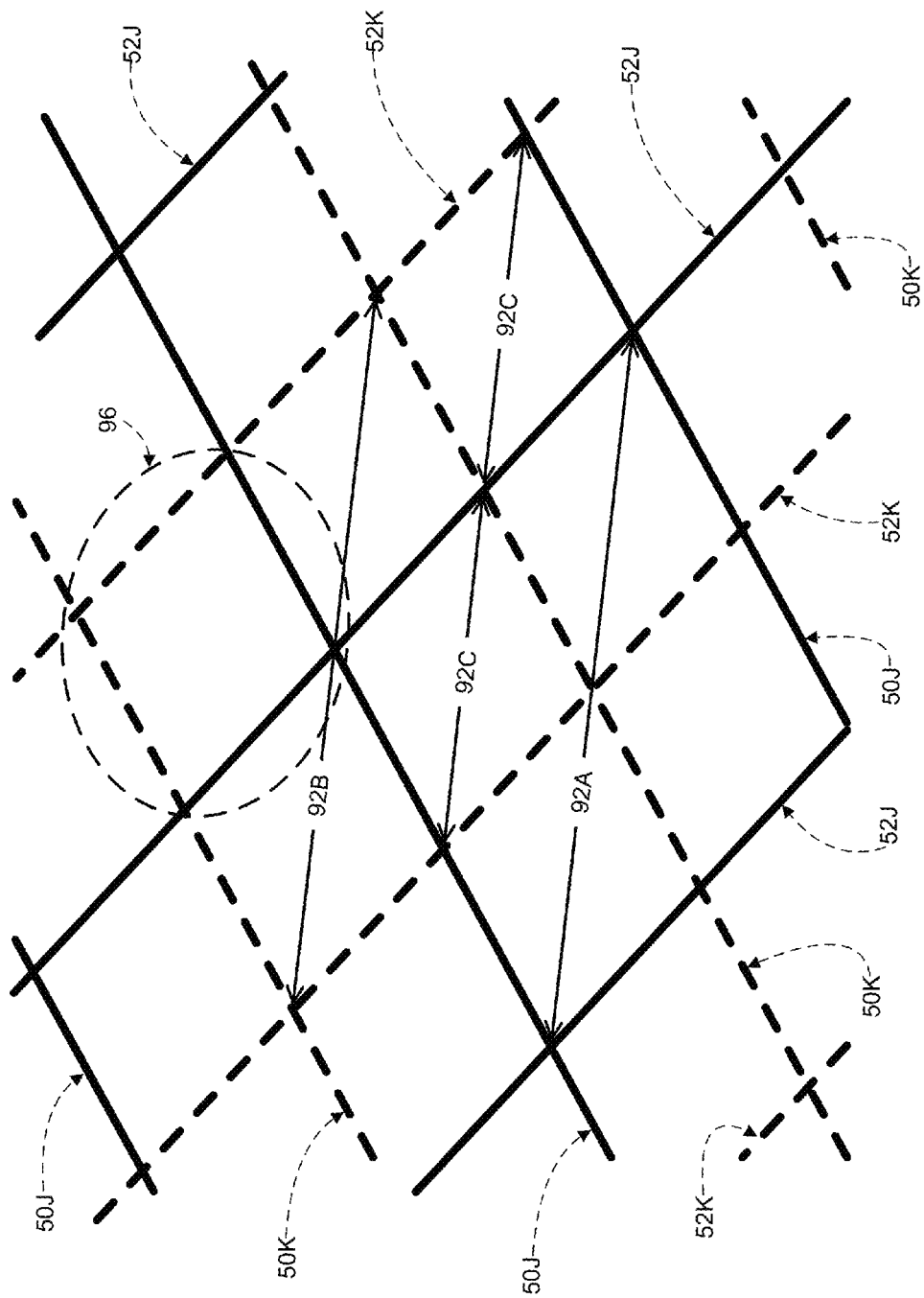
FIG. 6 illustrates example lines of an example mesh design.

FIG. 6 illustrates example lines 50 and 52 of an example mesh design. The mesh design in FIG. 6 is similar to the mesh designs in FIGS. 4-5 as well as the mesh designs in FIGS. 7-20 described below. In particular embodiments, a mesh pattern may include two or more conductive lines 50 and 52. In particular embodiments, a mesh pattern may include on the order of 1, 10, 100, 1,000, or any suitable number of conductive lines 50 and 52. This disclosure contemplates any suitable mesh pattern that includes any suitable number of conductive lines. Example conductive lines 50 and 52 of FIG. 6 may overlie a display portion; for clarity of viewing conductive lines 50 and 52, pixels of a display portion are not shown in FIG. 6. Angles of conductive lines 50 and 52 and horizontal separation distances between adjacent conductive lines 50 and 52 in FIG. 6 may be determined in a manner similar to that described above or below, or in any other suitable manner. Conductive lines 50 and 52 in FIG. 6 may be FLM and may be part of a mesh pattern of a touch sensor. Conductive lines 50 in FIG. 6 are substantially parallel to each other and are substantially evenly spaced from one another with adjacent conductive lines 50 having an approximately equal horizontal separation distance. Conductive lines 52 in FIG. 6 are also substantially parallel to each other and are also substantially evenly spaced from one another with adjacent conductive lines 52 having an approximately equal horizontal separation distance.

A mesh pattern represented by conductive lines 50 and 52 in the examples of FIGS. 4-6 (and FIGS. 7-20 described below) may have a single-layer, dual-layer, or suitable multi-layer configuration. In particular embodiments, a single-layer mesh pattern may refer to a mesh pattern where conductive lines 50 and 52 are disposed on one side or surface of a substrate. In particular embodiments, a dual-layer mesh pattern may refer to a mesh pattern having two layers of conductive lines 50 and 52, where each layer is disposed on a particular surface of one or more substrates. As an example and not by way of limitation, a dual-layer mesh pattern may have a first layer of conductive lines 50 and 52 disposed on one side or surface of a substrate and a second layer of conductive lines 50 and 52 disposed on another side or surface of the same substrate. As another example and not by way of limitation, a dual-layer mesh pattern may have a first layer of conductive lines 50 and 52 disposed on one surface of one substrate and a second layer of conductive lines 50 and 52 disposed on one surface of another substrate. This disclosure contemplates a touch sensor having a mesh pattern with any suitable number of layers of conductive lines 50 and 52. In such dual-layer (or multi-layer) touch-sensor configurations, one of the layers of conductive lines 50 and 52 may provide drive electrodes of the touch sensor and the other layer of conductive lines 50 and 52 may provide sense electrodes of the touch sensor.

The example mesh pattern of FIG. 6 may have a dual-layer configuration where conductive lines 50J and 52J (represented by solid lines) are included in a first layer disposed on one surface of a substrate, and conductive lines 50K and 52K (represented by dashed lines) are included in a second layer disposed on another surface of the same substrate or on a surface of another substrate. In FIG. 6, dashed lines 50K and 52K represent conductive lines that may be part of a particular layer, and, in particular embodiments, the conductive lines of a corresponding mesh pattern may be continuous conductive-line segments that are not dashed or broken, or may have a combination of continuous and broken conductive-line segments. Conductive lines 50K and 52K in FIG. 6 are represented by dashed lines only to visually distinguish them from conductive lines 50J and 52J. In particular embodiments, conductive lines 50 of a mesh pattern may be alternately disposed on the first or second layers of a dual-layer mesh pattern. In FIG. 6, conductive lines 50J may include a first group of every other line of conductive lines 50, and conductive lines 50J may be part of a first layer. Similarly, in FIG. 6, conductive lines 50K may include a second group (different from the first group) of every other line of conductive lines 50, and conductive lines 50K may be part of a second layer. As an example and not by way of limitation, if conductive lines 50 were sequentially identified by integers (e.g., 1, 2, 3, etc.), conductive lines 50J of a first layer may include all odd-numbered lines, and conductive lines 50K of a second layer may include all even-numbered lines. Similarly, in particular embodiments, conductive lines 52 of a mesh pattern may be alternately disposed on the first or second layers of a dual-layer mesh pattern. As an example and not by way of limitation, if conductive lines 52 were sequentially identified by integers, conductive lines 52J of a first layer may include all odd-numbered lines, and conductive lines 52K of a second layer may include all even-numbered lines. Although this disclosure describes and illustrates particular conductive lines disposed on particular layers of a multi-layer mesh pattern, this disclosure contemplates any suitable conductive lines disposed on any suitable layers of a multi-layer mesh pattern.

In particular embodiments, adjacent conductive lines 50 of the first layer may have a horizontal separation distance 70 along horizontal axis 28 that is substantially the same as a horizontal separation distance 70 of adjacent conductive lines 50 of the second layer. Similarly, in particular embodiments, adjacent conductive lines 52 of the first layer may have a horizontal separation distance 72 along horizontal axis 28 that is substantially the same as a horizontal separation distance 72 along of adjacent conductive lines 52 of the second layer. As an example and not by way of limitation, adjacent conductive lines 50 of a first layer may be separated from each other along horizontal axis 28 by a distance of approximately 4×$PP_x$, and adjacent conductive lines 50 of the second layer may have approximately the same horizontal separation distance. Additionally, adjacent conductive lines 52 of a first layer may be separated from each other along horizontal axis 28 by a distance of approximately 3×$PP_x$, and adjacent conductive lines 52 of the second layer may have approximately the same horizontal separation distance. Moreover, in such dual-layer touch-sensor configurations, a first layer of conductive lines 50 and 52 and a second layer of conductive lines 50 and 52 may be offset from each other by a specific distance along a specific direction. As an example and not by way of limitation, first and second layers of conductive lines may be offset from one another so that adjacent conductive lines 50 of the first and second layers are separated from each other along horizontal axis 28 by a distance of approximately 2×$PP_x$, and adjacent conductive lines 52 of the first and second layers are separated from each other along horizontal axis by approximately $$\frac{3}{2} \times PP_x.$$

Although this disclosure describes multi-layer touch sensors with particular offsets between conductive lines of different layers, this disclosure contemplates multi-layer touch sensors with any suitable offsets between conductive lines of different layers.

In the example dual-layer mesh design of FIG. 6, conductive lines 50J and 52J of a first layer may form a pattern having a diagonal length 92A, and conductive lines 50K and 52K of a second layer may form a pattern having a diagonal length 92B. In particular embodiments, diagonal lengths 92A and 92B may be approximately equal. In particular embodiments, a dual-layer mesh design formed from a combination of first and second layers may have a diagonal length 92C, where 92C is approximately one-half of 92A. In particular embodiments, diagonal lengths 92A and 92B may be referred to as first-layer and second-layer diagonal lengths, respectively, and diagonal length 92C may be referred to as a mesh-pattern diagonal length. As an example and not by way of limitation, diagonal lengths 92A and 92B in FIG. 6 may be approximately 630 µm, and diagonal length 92C may be approximately 315 µm. In particular embodiments, it may be preferable for a dual-layer mesh design to have diagonal lengths 92A and 92B in the range of approximately 530-680 µm and mesh-pattern diagonal length 92C in the range of approximately 265-340 µm. Although this disclosure describes and illustrates particular dual-layer mesh patterns with particular diagonal lengths, this disclosure contemplates any suitable dual-layer mesh patterns with any suitable diagonal lengths.

In particular embodiments, conductive lines 50 or conductive lines 52 of a dual-layer mesh pattern may have one or more portions disposed on a first layer and one or more portions disposed on a second layer of a dual-layer mesh pattern. In particular embodiments, a conductive line 50 or 52 may be separated into multiple distinct segments, where each segment is disposed on a first or second layer of a dual-layer mesh pattern. In particular embodiments, a conductive line 50 or 52 with multiple segments disposed on a first or second layer of a dual-layer mesh pattern may be viewed as a single, continuous line when seen from above a plane of the mesh pattern. As an example and not by way of limitation, a conductive line 50 may have three distinct portions: a first portion disposed on a first layer, a second portion disposed on a second layer, and a third portion disposed on the first layer. As another example and not by way of limitation, a mesh pattern may be split into three distinct areas, where the first and third areas are disposed on a first layer, and the second area is disposed on a second layer. Although this disclosure describes and illustrates mesh patterns having particular conductive lines with particular portions disposed on one or more surfaces, this disclosure contemplates any suitable mesh patterns having any suitable conductive lines with any suitable portions disposed on any suitable number of surfaces.

In particular embodiments, a mesh pattern overlaid over a repeating pixel pattern of a display may result in one or more moiré patterns, which may produce a spatially-dependent variation in brightness of a display, as discussed above. A moiré pattern may result from the repeating pattern of conductive lines 50 and 52 being superimposed onto the repeating pattern of pixels of a display. In particular embodiments, conductive lines 50 and 52 may occlude light originating from pixels of a display situated below a mesh pattern, and the pattern of occlusion associated with conductive lines 50 and 52 may result in one or more moiré patterns that may be visible by a user. In particular embodiments, the mesh patterns described herein or illustrated by any of FIGS. 4-20 may reduce the visibility of repeating patterns or low beat frequencies between conductive lines 50 and 52 and pixels of a display by reducing the amplitude or spatial period of one or more moiré patterns associated with the mesh pattern and a display. As an example and not by way of limitation, a mesh pattern characterized by angles 54 and 56 and line spacings 70 and 72, as described above or below, may result in a reduction in the amount of perceivable brightness variation or color variation associated with a moiré pattern.

Figure 7:
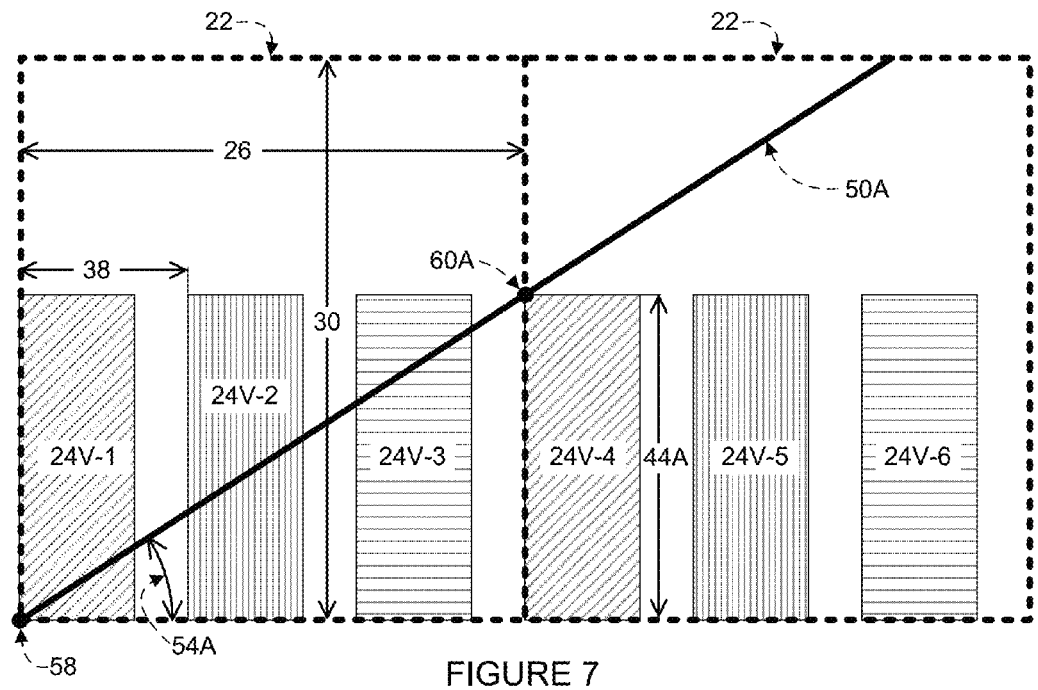
FIGS. 7-8 illustrate example pixels with example sub-pixels and example lines of an example mesh design.
Figure 8:
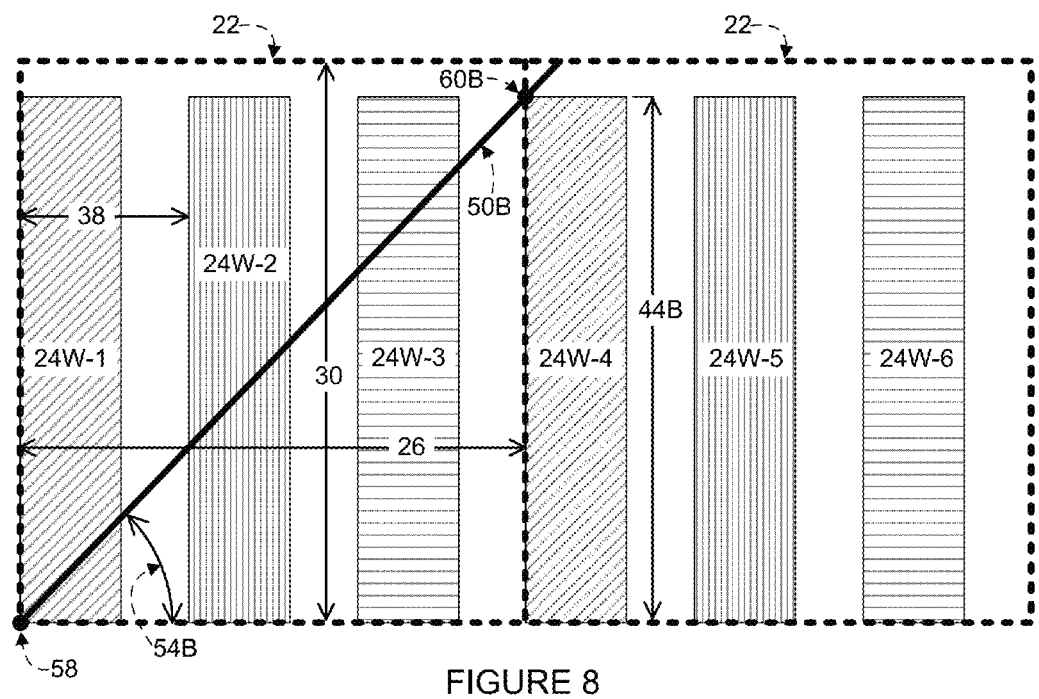

FIGS. 7-8 illustrate example pixels 22 with example sub-pixels 24 and example lines 50 of an example mesh design. In FIGS. 7-8, example conductive lines 50A and 50B may be FLM and may make up part of a mesh pattern of an electrode of a touch sensor. FIG. 7 illustrates two adjacent pixels 22 which may be a display portion, similar to portion 20, and FIG. 8 illustrates two adjacent pixels 22 which may be another display portion, similar to portion 20. Pixels 22 in FIGS. 7 and 8 have approximately the same horizontal pixel pitch 26, and similarly, pixels 22 in FIGS. 7 and 8 have approximately the same vertical pixel pitch 30. Sub-pixels 24V in FIG. 7 and sub-pixels 24W in FIG. 8, however, have different dimensions. In particular embodiments, sub-pixels 24V and 24W have different heights 44. In particular embodiments, sub-pixel 24V represents a shorter sub-pixel, and sub-pixel 24W represents a taller sub-pixel. Sub-pixels 24V in FIG. 7 have height 44A, and sub-pixels 24W in FIG. 8 have height 44B. As illustrated in FIGS. 7-8, sub-pixels 24W are taller than sub-pixels 24V, and height 44B is correspondingly greater than height 44A. In other particular embodiments, sub-pixels 24V and 24W may have approximately the same sub-pixel width 42, or sub-pixels 24V and 24W may have different widths 42. In the particular embodiment of FIGS. 7 and 8, horizontal sub-pixel pitch 38 is approximately the same. Although this disclosure describes and illustrates particular sub-pixels having particular widths and heights, this disclosure contemplates any suitable sub-pixels having any suitable widths and heights.

In the example of FIG. 7, angle 54A of conductive line 50A can be illustrated by a line that passes through reference points 58 and 60A, where reference point 58 is located at the lower left corner of sub-pixel 24V-1 and reference point 60A is located at the upper left corner of sub-pixel 24V-4. Similarly, in the example of FIG. 8, angle 54B of conductive line 50B can be illustrated by a line that passes through reference points 58 and 60B, where reference point 58 is located at the lower left corner of sub-pixel 24W-1 and reference point 60B is located at the upper left corner of sub-pixel 24W-4. In FIGS. 7-8, sub-pixel height 44B is greater than sub-pixel height 44A, such that angle 54B is greater than angle 54A.

Figure 9:
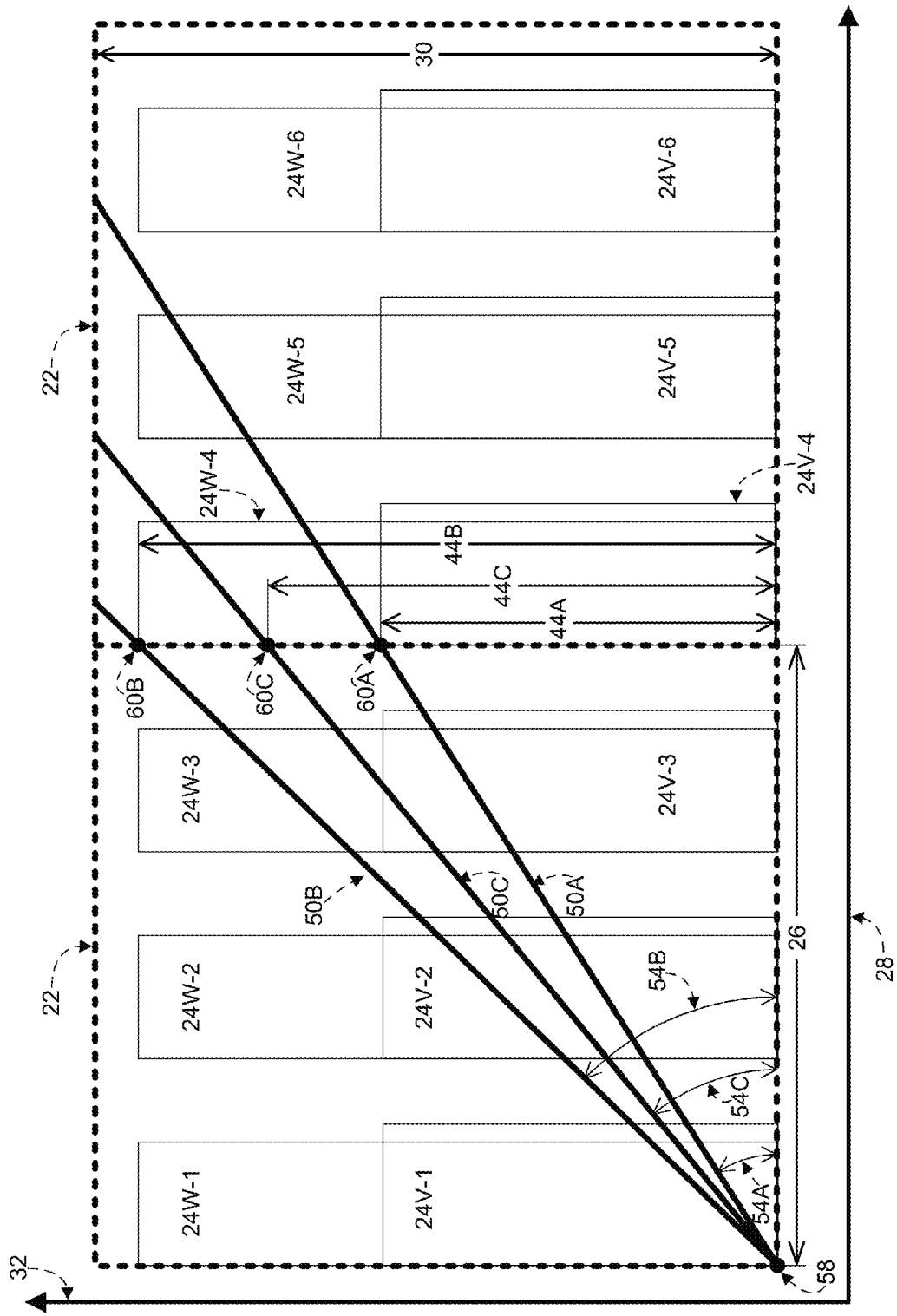
FIG. 9 illustrates the example pixels, sub-pixels, and lines of FIGS. 7 and 8 overlaid on one another.

FIG. 9 illustrates the example pixels 22, sub-pixels 24, and lines 50 of FIGS. 7 and 8 overlaid on one another. Sub-pixels 24V may represent one display, and sub-pixels 24W may represent a second display overlaid on the first display for the purposes of visualizing the two displays simultaneously. For clarity of visualizing the features of FIG. 9 (and FIGS. 10-15 below), sub-pixels 24 in FIGS. 9-15 are not shaded or hatched. In the example of FIG. 9, conductive line 50A is oriented at an angle 54A relative to horizontal axis 28, and, as described above, angle 54A of conductive line 50A can be illustrated by a line that passes through reference points 58 and 60A. The slope of conductive line 50A may be defined as the vertical rise of conductive line 50A divided by the horizontal run of conductive line 50A, and angle 54A can be found from the arctangent of the slope. In the example of FIG. 9, the vertical rise of conductive line 50A is $SPH_A$ 44A (sub-pixel height of sub-pixel 24V), and the horizontal run of conductive line 50A is HPP 26. Thus, the slope of conductive line 50A equals $SPH_A$/HPP, and angle 54A ($\Theta_A$) can be found from the expression $\Theta_A$=arctan ($SPH_A$/HPP). In the example of FIG. 9, conductive line 50B is oriented at an angle 54B relative to horizontal axis 28, and, as described above, angle 54B of conductive line 50B can be illustrated by a line that passes through reference points 58 and 60B. The slope of conductive line 50B may be defined as the vertical rise of conductive line 50B divided by the horizontal run of conductive line 50B, and angle 54B can be found from the arctangent of the slope. In the example of FIG. 9, the vertical rise of conductive line 50B is $SPH_B$ 44B (sub-pixel height of sub-pixel 24W), and the horizontal run of conductive line 50B is HPP 26. Thus, the slope of conductive line 50A equals $SPH_B$/HPP, and angle 54B ($\Theta_B$) can be found from the expression $\Theta_B$=arctan($SPH_B$/HPP). As illustrated in FIG. 9, $SPH_B$ 44B is greater than $SPH_A$ 44A, and angle 54B ($\Theta_B$) is greater than angle 54A ($\Theta_A$).

In the example of FIG. 9, conductive line 50C is oriented at an angle 54C relative to horizontal axis 28, and angle 54C of conductive line 50C can be illustrated by a line that passes through reference points 58 and 60C. In FIG. 9, reference point 60C is located along a border between the two pixels 22, and reference point 60C is located at or between reference points 60A and 60C. In FIG. 9, reference point 60C is located at height 44C above a lower edge of pixels 22. In particular embodiments, height 44C may be denoted as $H_C$, and height 44C may be greater than or equal to $SPH_A$ 44A and less than or equal to $SPH_B$ 44B. In particular embodiments, the relationship between $SPH_A$ 44A, $SPH_B$ 44B, and $H_C$ 44C may be expressed as $SPH_A \leq H_C \leq SPH_B$.

In the example of FIG. 9, the slope of conductive line 50C may be defined as the vertical rise of conductive line 50C divided by the horizontal run of conductive line 50C, and angle 54C can be found from the arctangent of the slope. The vertical rise of conductive line 50C is height 44C, and the horizontal run of conductive line 50C is HPP 26. Thus, the slope of conductive line 50C equals $H_C$/HPP, and angle 54C ($\Theta_C$) can be found from the expression $\Theta_C$=arctan($H_C$/HPP). In particular embodiments, angle 54C ($\Theta_C$) may be greater than or equal to angle 54A ($\Theta_A$) and less than or equal to angle 54B ($\Theta_B$). In particular embodiments, the relationship between angles 54A ($\Theta_A$), 54B ($\Theta_B$), and 54C ($\Theta_C$) may be expressed as $\Theta_A \leq \Theta_C \leq \Theta_B$. In particular embodiments, angle 54C may be any suitable angle between or equal to angles 54A and angles 54B. In particular embodiments, height 44C may approximately equal an average of $SPH_A$ 44A and $SPH_B$ 44B, and angle 54C ($\Theta_C$) may be found from the expression $\Theta_C$=arctan [$SPH_A$+$SPH_B$)/(2×HPP)]. In particular embodiments, angle 54C ($\Theta_C$) may approximately equal an average of angles 54A ($\Theta_A$) and 54B ($\Theta_B$), and angle 54C ($\Theta_C$) may be found from the expression $$\Theta_C \cong \frac{1}{2} \times \left[\arctan\left(\frac{SPH_A}{HPP}\right) + \arctan\left(\frac{SPH_B}{HPP}\right)\right].$$

Although this disclosure describes and illustrates particular conductive lines 50 having particular angles 54, this disclosure contemplates any suitable conductive lines 50 having any suitable angles 54.

In the example of FIG. 9, sub-pixels 24V may represent sub-pixels of one display, and sub-pixels 24W may represent sub-pixels of another display. In particular embodiments, a display that includes sub-pixels 24V may have substantially the same pixel pitches (HPP 26 and VPP 30) as a display that includes sub-pixels 24W. In particular embodiments, a mesh pattern that includes one or more conductive lines 50C having an angle 54C as described above may make up part of an electrode of a touch sensor that may be used with two or more displays. In particular embodiments, a mesh pattern including one or more conductive lines 50C with an angle 54C as described above may make up part of an electrode of a touch sensor that may be used with one display that includes sub-pixels 24V and another display that includes sub-pixels 24W.

In particular embodiments, a conductive line 50 having an angle 54 may be defined for the case of three or more displays, where each display may have substantially the same HPP 26, and sub-pixels 24 of one or more of the displays may have different heights (SPHs 44). In particular embodiments, a mesh pattern that includes conductive lines 50 having an angle 54 may make up part of an electrode of a touch sensor that may be used with three or more displays. As an example and not by way of limitation, a mesh pattern that includes conductive lines 50 having an angle 54 ($\Theta_D$) may be used with N displays, where N is an integer greater than or equal to 2, and the N displays have sub-pixels 24 with minimum height $SPH_1$ and maximum height $SPH_N$. For such an example mesh pattern, angle 54 ($\Theta_D$) can be found from the expression $\Theta_D$=arctan($H_D$/HPP), where $SPH_1 \leq H_D \leq SPH_N$. As an example and not by way of limitation, a mesh pattern that includes conductive lines 50 having an angle 54 ($\Theta_4$) may be used with three displays having sub-pixels 24 with heights $SPH_1$, $SPH_2$, and $SPH_3$, where $SPH_1 \leq SPH_2 \leq SPH_3$. In particular embodiments, angle 54 ($\Theta_4$) for a mesh pattern that may be used with three displays can be found from the expression $\Theta_4 = \arctan(H_4/HPP)$, where $H_4$ may be any value between or equal to $SPH_1$ and $SPH_3$ so that $SPH_1 \leq H_4 \leq SPH_3$. In particular embodiments, $H_4$ may be an average of $SPH_1$, $SPH_2$, and $SPH_3$, so that $H_4 = (SPH_1 + SPH_2 + SPH_3)/3$, and angle 54 ($\Theta_4$) can be found from the expression $\Theta_4 = \arctan[(SPH_1 + SPH_2 + SPH_3)/(3 \times HPP)]$.

Figure 10:
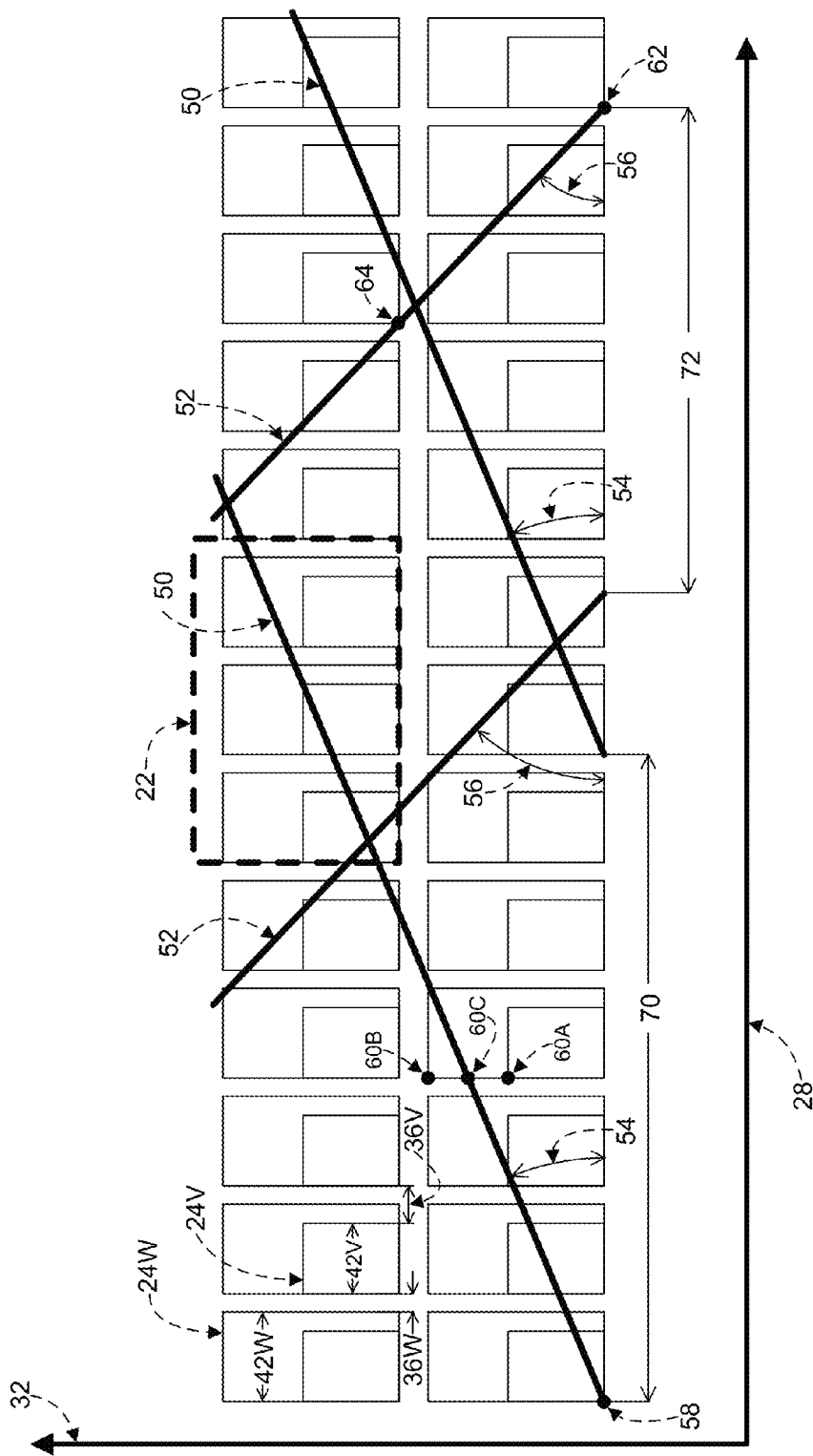
FIGS. 10-12 illustrate example mesh designs overlying example portions of example displays.
Figure 11:
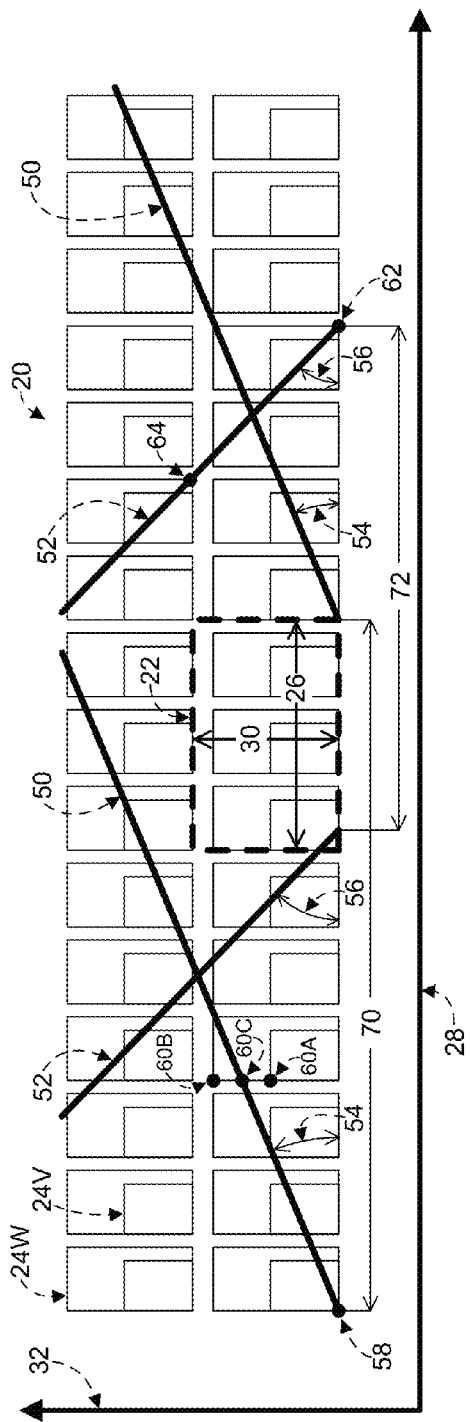
Figure 12:
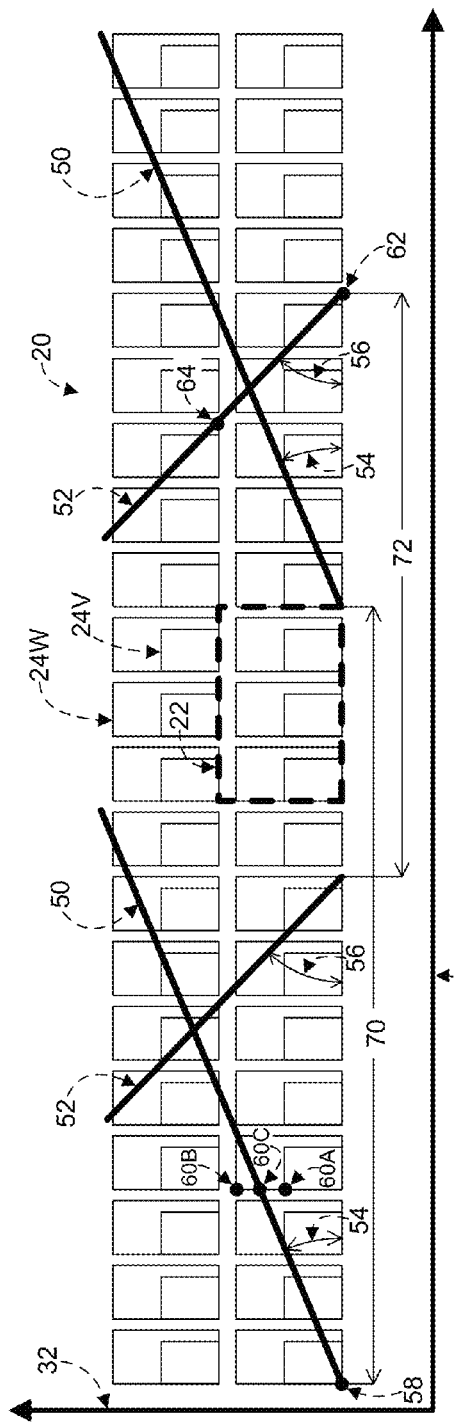

FIGS. 10-12 illustrate example mesh designs overlying example portions of example displays. Conductive lines 50 and 52 in FIGS. 10-12 may be FLM and may be part of a mesh pattern of a touch sensor. Conductive lines 50 in each of FIGS. 10-12 are substantially parallel to each other, and each conductive line 50 forms an angle 54 relative to horizontal axis 28. Additionally, conductive lines 50 in each of FIGS. 10-12 are substantially evenly spaced from one another with adjacent conductive lines 50 having an equal horizontal separation distance 70. Conductive lines 52 in FIGS. 10-12 are also substantially parallel to each other, forming an angle 56 relative to horizontal axis 28. Conductive lines 52 are also substantially evenly spaced from one another with adjacent conductive lines 52 having an equal horizontal separation distance 72.

In FIGS. 10-12, two sets of sub-pixels with different SPHs 44 are shown, where sub-pixel 24V is a shorter sub-pixel having height $SPH_A$, and sub-pixel 24W is a taller sub-pixel having height $SPH_B$. In FIGS. 10-12, sub-pixels 24V represent one display, and sub-pixels 24W represent a second display overlaid on the first display for the purposes of visualizing the two displays simultaneously. In particular embodiments, sub-pixels 24V and 24W may have different widths (SPW 42), or sub-pixels 24V and 24W may have approximately the same width. In each example of FIGS. 10-12 conductive lines 50 and 52 may represent a mesh design of part of an electrode of a touch sensor that may be used with either of the two displays. In particular embodiments, other mesh designs may be described in a similar manner and may be used with three, four, or more displays. Although this disclosure describes and illustrates particular mesh designs for use with a particular number of displays, this disclosure contemplates any suitable mesh designs for use with any suitable number of displays.

In FIGS. 10-12, conductive lines 50 have angle 54 ($\Theta_C$) relative to horizontal axis 28, where angle 54 may be illustrated by a line passing through reference points 58 and 60C. As described above in the example of FIG. 9, angle 54 ($\Theta_C$) in FIGS. 10-12 can be found from the expression $\Theta_C = \arctan(H_C/HPP)$, where $SPH_A \leq H_C \leq SPH_B$. Conductive lines 52 have angle 56 ($\Theta_2$) relative to horizontal axis 28, where angle 56 may be illustrated by a line passing through reference points 62 and 64. As described above, angle 56 ($\Theta_2$) can be found from the expression $\Theta_2 = \arctan(VPP/2 \cdot HSPP)$. In particular embodiments, angle 56, which depends on the vertical pixel pitch (VPP) and the horizontal sub-pixel pitch (HSPP), may be independent of sub-pixel dimensions (SPW and SPH). In the examples of FIGS. 10-12, conductive lines 50 are oriented counterclockwise at angle 54 relative to horizontal axis 28, and conductive lines 52 are oriented clockwise at angle 56 relative to horizontal axis 28. Although this disclosure describes and illustrates example conductive lines 50 and 52 having particular orientations relative to horizontal axis 28, this disclosure contemplates any suitable clockwise or counterclockwise orientation of conductive lines relative to any suitable axis.

In FIGS. 10-12, conductive lines 50 have a horizontal separation distance 70 along horizontal axis 28 that is approximately $D_{70} = k \times PP_x$, where $D_{70}$ is horizontal separation distance 70 of conductive lines 50, k is a positive integer, and $PP_x$ is horizontal pixel pitch 26. Conductive lines 52 have a horizontal separation distance 72 along horizontal axis that is approximately $$D_{72} = \frac{3}{4} \times k \times PP_x,$$

where $D_{72}$ is horizontal separation distance 72 of conductive lines 52 and k is the same positive integer used to determine $D_{70}$. In the example mesh design of FIG. 10, the line-separation parameter k equals 2 so that so that horizontal separation distance 70 is $2 \times PP_x$, and horizontal separation distance 72 is $$\frac{3}{2} \times PP_x.$$

In the example mesh design of FIG. 11, the line-separation parameter k equals 3 so that so that horizontal separation distance 70 is $3 \times PP_x$, and horizontal separation distance 72 is $$\frac{9}{4} \times PP_x.$$

In the example mesh design of FIG. 12, the line-separation parameter k equals 4 so that so that horizontal separation distance 70 is $4 \times PP_x$, and horizontal separation distance 72 is $3 \times PP_x$. Although this disclosure describes and illustrates particular mesh designs having particular horizontal separation distances between conductive lines, this disclosure contemplates any suitable mesh design having any suitable horizontal separation distances between conductive lines.

In particular embodiments, a mesh design such as that described above and illustrated in FIGS. 10-12 may be applied to a display having sub-pixels 24 with complex shapes. In particular embodiments, a sub-pixel 24 with a complex shape may refer to a sub-pixel 24 with a shape formed from a combination of multiple lines, curves, or shapes. As an example and not by way of limitation, a sub-pixel 24 with a complex shape may include one or more beveled, rounded, or chamfered corners. As another example and not by way of limitation, a sub-pixel 24 with a complex shape may include a sub-pixel 24 that extends along vertical axis 32 and terminates on its upper edge with a non-uniform shape so that it may not be considered to have a single, uniform sub-pixel height 44. Such a complex-shaped sub-pixel may appear as a combination of two or more adjacent rectangular shapes placed next to one another, where each rectangular shape may have a different height. In particular embodiments, a complex-shaped sub-pixel formed as a combination of two or more adjacent rectangular shapes having different heights may be considered to have two or more distinct values for its sub-pixel height 44. In particular embodiments, a complex-shaped sub-pixel 24 may have an average sub-pixel height designated $SPD_{y,AVG}$. As an example and not by way of limitation, for a sub-pixel 24 having two distinct heights, $SPD_{y1}$ and $SPD_{y2}$, an average sub-pixel height may be expressed as $$SPD_{y,AVG} = \frac{SPD_{y1} + SPD_{y2}}{2}.$$

As another example and not by way of limitation, for a sub-pixel 24 having an upper edge with a non-uniform shape and a maximum height $SPD_{y,MAX}$ and a minimum height $SPD_{y,MIN}$, an average sub-pixel height may be expressed as $$SPD_{y,AVG} = \frac{SPD_{y,MAX} + SPD_{y,MIN}}{2}.$$

In particular embodiments, angle 54 of a mesh design for a display having a complex-shaped sub-pixel may be found from the expression $$\theta_{54} = \arctan\left(\frac{SPD_{y,AVG}}{PP_x}\right).$$

Although this disclosure describes particular complex-shaped sub-pixels having average sub-pixel heights calculated in particular manners, this disclosure contemplates any suitable complex-shaped sub-pixels having average sub-pixel heights calculated in any suitable manner.

Figure 13:
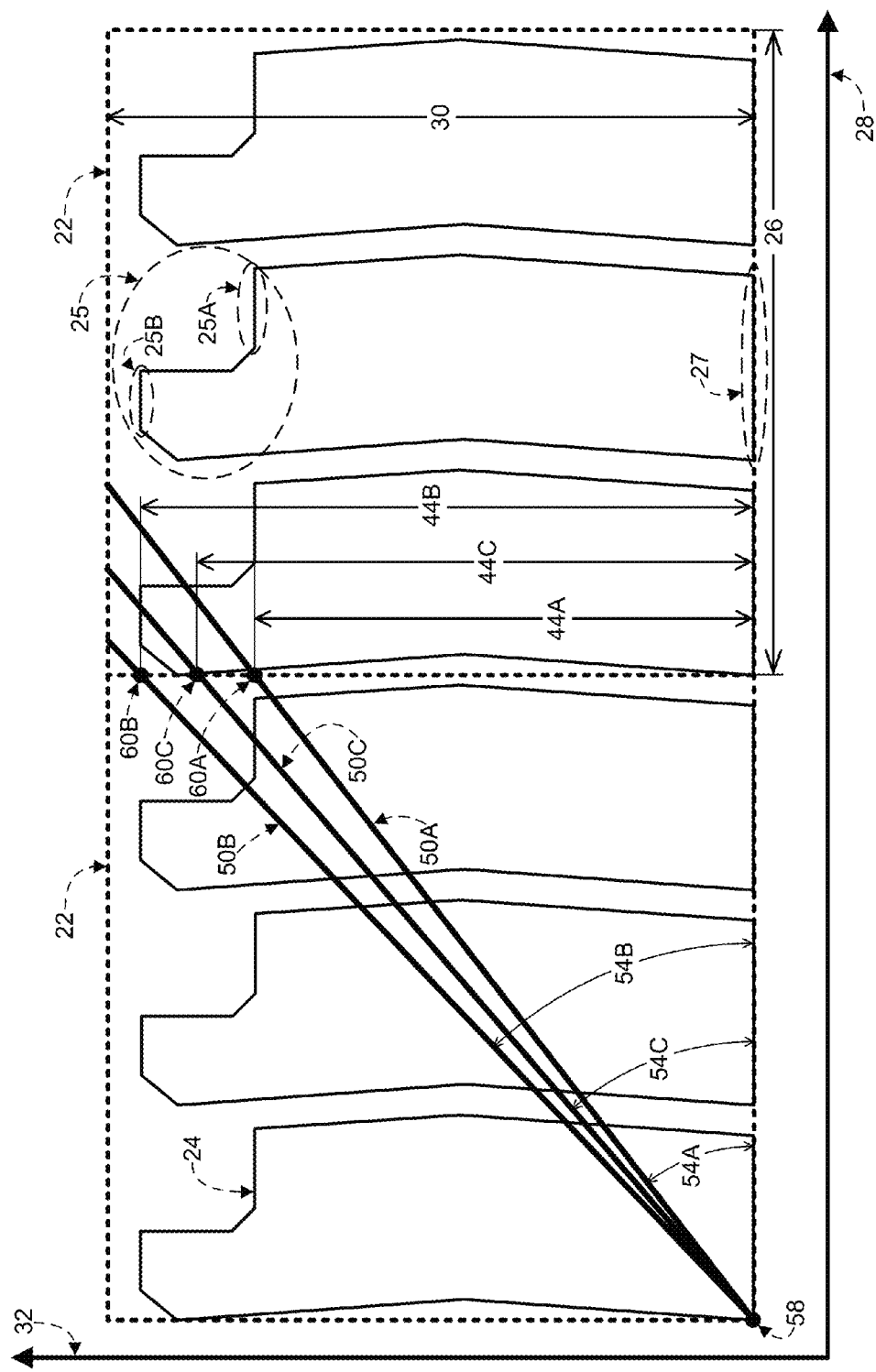
FIG. 13 illustrates example pixels with example complex-shaped sub-pixels and example lines of an example mesh design.
Figure 14:
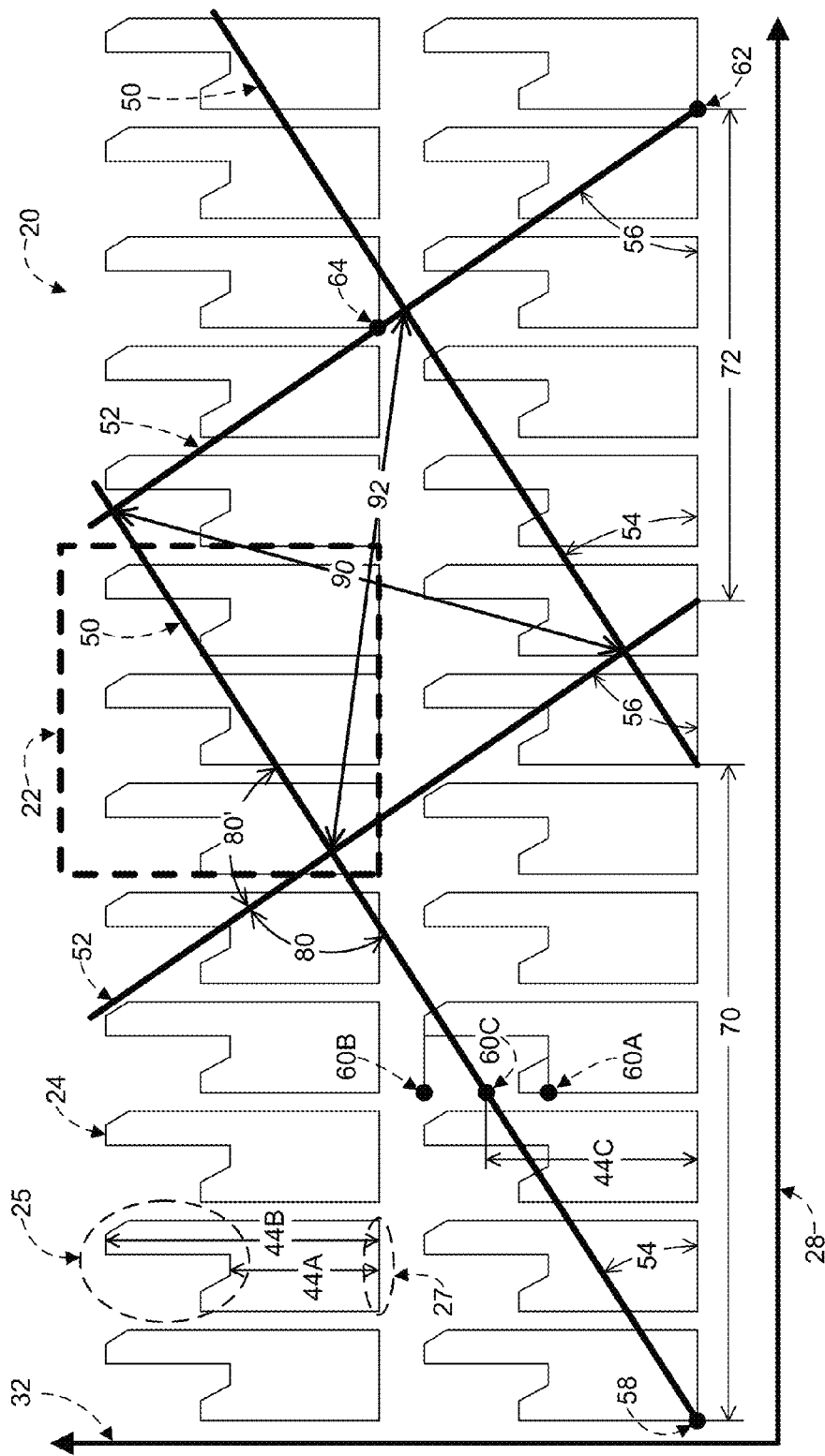
FIGS. 14-15 illustrate example mesh designs overlying example portions of example displays that have complex-shaped sub-pixels.
Figure 15:
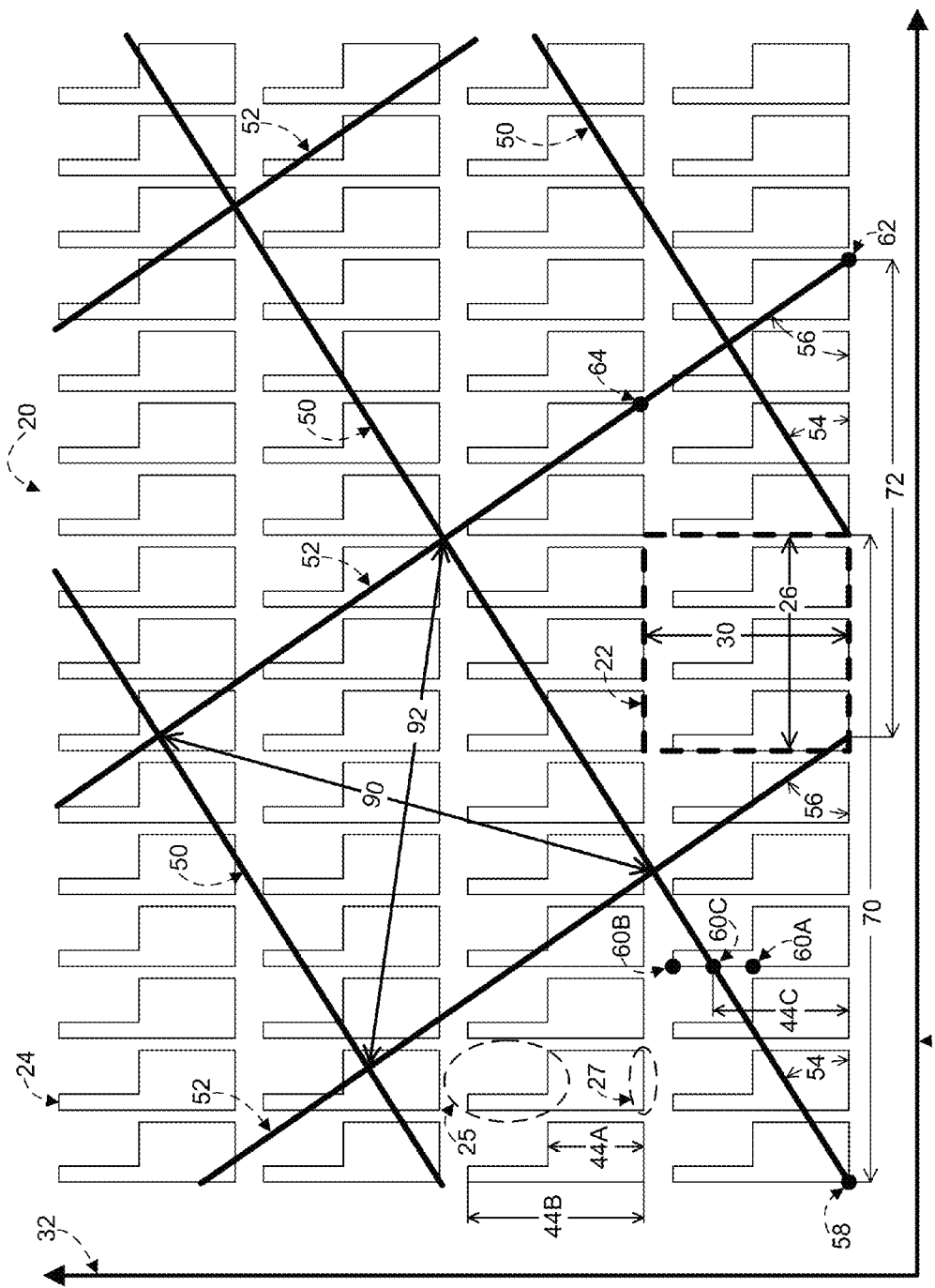

FIG. 13 illustrates example pixels 22 with example complex-shaped sub-pixels 24 and example lines 50 of an example mesh design. In FIG. 13, example conductive lines 50A, 50B, and 50C may be FLM, and line 50A, 50B, or 50C may make up part of a mesh pattern of a touch sensor configured to extend across a display that includes complex-shaped sub-pixels. FIG. 13 illustrates two adjacent pixels 22 which may be a display portion, similar to portion 20. For clarity of visualizing the features of FIGS. 13-15, sub-pixels 24 in FIGS. 13-15 are not shaded or hatched. In the example of FIG. 13, each pixel 22 includes three sub-pixels 24, and each of the three sub-pixels 24 of a pixel 22 may correspond to a particular color, such as for example, red, green, or blue. In the example of FIG. 13, sub-pixel 24 has an overall chevron shape, and sub-pixel 24 also includes a complex shape that is at least in part characterized by non-uniform shape 25. In particular embodiments, non-uniform shape 25 may include one or more lines, curves, corners, or points that form an upper edge of sub-pixel 24. In the example of FIG. 13, non-uniform shape 25 includes multiple line segments and chamfered corners. Sub-pixel 24 in FIG. 13 has a uniform lower edge 27 that is not complex-shaped and that includes a single line that is substantially parallel to horizontal axis 28. In particular embodiments, a complex-shaped sub-pixel can have an upper edge with a non-uniform shape or a lower edge with a non-uniform shape, or both upper and lower edges with non-uniform shapes.

In FIG. 13, sub-pixel 24 has a complex shape that may not be considered as having a single, uniform sub-pixel height 44. In particular embodiments, a complex-shaped sub-pixel may have two or more distinct values associated with its sub-pixel height. In FIG. 13, sub-pixel 24 has two distinct values associated with its sub-pixel height: minimum sub-pixel height ($SPD_{y,MIN}$) 44A and maximum sub-pixel height ($SPD_{y,MAX}$) 44B. Minimum sub-pixel height 44A is a distance between lower edge 27 of sub-pixel 24 and minimum-height feature 25A of the upper edge, where minimum-height feature 25A is a feature (e.g., a line segment, curve, or corner) of non-uniform shape 25 having a minimum distance from lower edge 27. Similarly, maximum sub-pixel height 44B is a distance between lower edge 27 of sub-pixel 24 and maximum-height feature 25B of the upper edge, where maximum-height feature 25B is a feature of non-uniform shape 25 having a maximum distance from lower edge 27. In particular embodiments, minimum sub-pixel height ($SPD_{y,MIN}$) 44A may be referred to as a minimum sub-pixel dimension along vertical axis 32, and maximum sub-pixel height ($SPD_{y,MAX}$) 44B may be referred to as a maximum sub-pixel dimension along vertical axis 32.

In particular embodiments, a complex-shaped sub-pixel may have an average sub-pixel height ($SPD_{y,AVG}$) 44C that is any value between or equal to the minimum 44A and maximum 44B sub-pixel heights so that $SPD_{y,MIN} \leq SPD_{y,AVG} \leq SPD_{y,MAX}$. As an example and not by way of limitation, for a complex-shaped sub-pixel with minimum sub-pixel height 125 μm and maximum sub-pixel height 135 μm, average sub-pixel height may be approximately equal to 125 μm, 130 μm, 135 μm, or any other suitable value. In particular embodiments, average sub-pixel height ($SPD_{y,AVG}$) 44C may be referred to as an average sub-pixel dimension along vertical axis 32. In the example of FIG. 13, the average sub-pixel height 44C is the average of the minimum 44A and maximum 44B sub-pixel heights so that $$SPD_{y,AVG} = \frac{SPD_{y,MAX} + SPD_{y,MIN}}{2}.$$

Although this disclosure describes and illustrates particular sub-pixels having particular complex shapes with particular average sub-pixel heights, this disclosure contemplates any suitable sub-pixels having any suitable complex shapes with any suitable average sub-pixel heights.

In the example of FIG. 13, conductive lines 50A, 50B, and 50C are oriented at angles 54A ($\theta_{54A}$), 54B ($\theta_{54B}$), 54A ($\theta_{54C}$), respectively, relative to horizontal axis 28. Angle 54A of conductive line 50A can be illustrated by a line that passes through reference points 58 and 60A, where reference point 58 is located at the lower left corner of a pixel 22. Relative to reference point 58, reference point 60A is located one horizontal pixel pitch 26 in the direction of horizontal axis 28 (e.g., to the right) and one minimum sub-pixel height ($SPD_{y,MIN}$) 44A in the direction of vertical axis 32. Similarly, angle 54B of conductive line 50B can be illustrated by a line that passes through reference points 58 and 60B, where, relative to reference point 58, reference point 60B is located one horizontal pixel pitch 26 in the direction of horizontal axis 28 and one maximum sub-pixel height ($SPD_{y,MAX}$) 44B in the direction of vertical axis 32. In FIG. 13, maximum sub-pixel height 44B is greater than minimum sub-pixel height 44A, and correspondingly, angle 54B is greater than angle 54A. In particular embodiments, angle 54C of conductive line 50C can be illustrated by a line that passes through reference points 58 and 60C, where, relative to reference point 58, reference point 60C is located one horizontal pixel pitch 26 in the direction of horizontal axis 28 and one average sub-pixel height ($SPD_{y,AVG}$) 44A in the direction of vertical axis 32. In FIG. 13, reference point 60C is located along a border or interface between two pixels 22, and reference point 60C is located between reference points 60A and 60B.

In particular embodiments, the slope of conductive line 50C may be defined as the vertical rise of conductive line 50C divided by the horizontal run of conductive line 50C, and angle 54C can be found from the arctangent of that slope. In the example of FIG. 13, the vertical rise of conductive line 50C is average sub-pixel height (SPD$_{y,AVG}$) 44C, and the horizontal run of conductive line 50C is horizontal pixel pitch (PP$_x$) 26. Thus, the slope of conductive line 50C equals $$\left(\frac{SPD_{y,AVG}}{PP_x}\right),$$

and angle 54C: can be found from the expression $$\theta_{54C} = \arctan\left(\frac{SPD_{y,AVG}}{PP_x}\right).$$

Similarly, angle 54A can be found from the expression $$\theta_{54A} = \arctan\left(\frac{SPD_{y,Min}}{PP_x}\right),$$

and angle 54B can be found from the expression $$\theta_{54B} = \arctan\left(\frac{SPD_{y,Max}}{PP_x}\right).$$

In particular embodiments, average sub-pixel height (SPD$_{y,AVG}$) 44C is a value between the minimum 44A and maximum 44B sub-pixel heights, and correspondingly, angle 54C is between angles 54A and 54B so that $\theta_{54A} \leq \theta_{54C} \leq \theta_{54B}$. In the example of FIG. 13, the average sub-pixel height 44C is the average of the minimum 44A and maximum 44B sub-pixel heights so that angle 54C can be found from the expression $$\theta_{54C} = \arctan\left(\frac{SPD_{y,MAX} + SPD_{y,MIN}}{2 \times PP_x}\right).$$

In particular embodiments, angle 54C may be an average of angles 54A and 54B so that angle 54C can be found from the expression $$\theta_{54C} = \frac{1}{2} \times \left[\arctan\left(\frac{SPD_{y,Min}}{PP_x}\right) + \arctan\left(\frac{SPD_{y,Max}}{PP_x}\right)\right].$$

In particular embodiments, a mesh pattern including one or more conductive lines 50C with an angle 54C as described above may make up part of an electrode of a touch sensor that may be used with a display having complex-shaped sub-pixels.

FIGS. 14 and 15 illustrate example mesh designs overlying example portions of example displays that have complex-shaped sub-pixels 24. In FIGS. 14-15, each of the three sub-pixels 24 of a pixel 22 may correspond to a particular color, such as for example, red, green, or blue. Conductive lines 50 and 52 in FIGS. 14-15 may be FLM and may be part of a mesh pattern of a touch sensor configured to extend across a display that includes complex-shaped sub-pixels. Conductive lines 50 in each of FIGS. 14-15 are substantially parallel to each other, and each conductive line 50 forms an angle 54 relative to horizontal axis 28. Additionally, conductive lines 50 in each of FIGS. 14-15 are substantially evenly spaced from one another with adjacent conductive lines 50 having an equal horizontal separation distance 70. Conductive lines 52 in FIGS. 14-15 are also substantially parallel to each other, each line forming an angle 56 relative to horizontal axis 28. Conductive lines 52 are also substantially evenly spaced from one another with adjacent conductive lines 52 having an equal horizontal separation distance 72. In the examples of FIGS. 14-15, conductive lines 50 are oriented counterclockwise at angle 54 relative to horizontal axis 28, and conductive lines 52 are oriented clockwise at angle 56 relative to horizontal axis 28. Although this disclosure describes and illustrates example conductive lines 50 and 52 having particular orientations relative to horizontal axis 28, this disclosure contemplates any suitable clockwise or counterclockwise orientation of conductive lines relative to any suitable axis.

In the examples of FIGS. 14-15, complex-shaped sub-pixels 24 are characterized by non-uniform shapes 25 that form upper edges of sub-pixels 24. In FIG. 14, each complex-shaped sub-pixel 24 has a non-uniform shape 25 that includes multiple line segments and chamfered corners. In FIG. 15, each complex-shaped sub-pixel appears as a combination of two adjacent rectangles, each rectangle having a different height. Complex-shaped sub-pixels 24 in FIGS. 14-15 are characterized by minimum 44A and maximum 44B sub-pixel heights. Reference point 60A is located at minimum sub-pixel height 44A, and reference point 60B is located at maximum sub-pixel height 44B. Reference point 60C is located at average sub-pixel height 44C, which is between reference points 60A and 60B.

In FIGS. 14-15, conductive lines 50 have angle 54 ($\theta_{54}$) relative to horizontal axis 28, where angle 54 may be illustrated by a line passing through reference points 58 and 60C. As described above in the example of FIG. 13, angle 54 in FIGS. 14-15 can be found from the expression $$\theta_{54} = \arctan\left(\frac{SPD_{y,AVG}}{PP_x}\right),$$

where SPD$_{y,MIN} \leq$ SPD$_{y,AVG} \leq$ SPD$_{y,MAX}$. Conductive lines 52 have angle 56 ($\theta_{56}$) relative to horizontal axis 28, where angle 56 may be illustrated by a line passing through reference points 62 and 64. As described above, angle 56 can be found from the expression $$\theta_{56} = \arctan\left(\frac{PP_y}{2 \times SPP_x}\right).$$

As an example and not by way of limitation, display portion 20 in FIG. 14 may have substantially square pixels 22 with height and width of approximately 100 μm so that PP$_x \cong$ PP$_y \cong$ 100 μm. Additionally, display portion 20 may have a SPP$_x$ 38 of approximately 33.3 μm. Complex-shaped sub-pixels may have a minimum sub-pixel height 44A of 72 μm and a maximum sub-pixel height 44B of 82 μm, corresponding to an average sub-pixel height of 77 μm. For such an example display portion 20, angle 54 of conductive line 50 is $$\theta_{54} = \arctan\left(\frac{SPD_{y,AVG}}{PP_x}\right) = \arctan\left(\frac{77}{100}\right) \cong 37.6°,$$

and angle 56 of conductive line 52 is $$\theta_{56} = \arctan\left(\frac{PP_y}{2 \times SPP_x}\right) = \arctan\left(\frac{100}{2 \times 33.3}\right) \cong 56.3°.$$

In particular embodiments, conductive lines 50 and 52 may make up part of a mesh pattern of a touch sensor and angles $\theta_{54}$ and $\theta_{56}$ may vary by up to 0.2°, 0.5°, 1°, or any suitable angular amount from the values calculated in the expressions above. As an example and not by way of limitation, a mesh pattern may include conductive lines 50 with angle 54 that is within 1° of 37.6° so that angle 54 may be between 36.6° and 38.6°.

In FIGS. 14-15, conductive lines 50 have a horizontal separation distance 70 along horizontal axis 28 that is approximately $D_{70} = k \times PP_x$, where $D_{70}$ is horizontal separation distance 70 of conductive lines 50, k is a positive integer, and $PP_x$ is horizontal pixel pitch 26. Conductive lines 52 have a horizontal separation distance 72 along horizontal axis that is approximately $$D_{72} = \frac{3}{4} \times k \times PP_x,$$

where $D_{72}$ 15 horizontal separation distance 72 of conductive lines 52 and k is the same positive integer used to determine $D_{70}$. In the example mesh design of FIG. 14, the line-separation parameter k equals 2 so that so that horizontal separation distance 70 is $2 \times PP_x$, and horizontal separation distance 72 is $$\frac{3}{2} \times PP_x.$$

In the example mesh design of FIG. 15, the line-separation parameter k equals 3 so that so that horizontal separation distance 70 is $3 \times PP_x$, and horizontal separation distance 72 is $$\frac{9}{4} \times PP_x.$$

In particular embodiments, conductive lines 50 may have a horizontal separation distance 70 along horizontal axis 28 that may be expressed as $D_{70} = k \times PP_x$, where $D_{70}$ is horizontal separation distance 70 of conductive lines 50, k is a positive integer, and $PP_x$ is horizontal pixel pitch 26. Similarly, in particular embodiments, conductive lines 52 may have a horizontal separation distance 72 along horizontal axis that may be expressed as $$D_{72} = \frac{13}{18} \times k \times PP_x,$$

where $D_{72}$ is horizontal separation distance 72 of conductive lines 52, and k is the same positive integer used to determine $D_{70}$. Horizontal separation distance 72 may also be expressed equivalently as $$D_{72} = \left(2\frac{1}{6}\right) \times \frac{k}{3} \times PP_x.$$

In particular embodiments, if horizontal pixel pitch 26 equals three times horizontal sub-pixel pitch 38, the expression for horizontal separation distance 72 may be written $$D_{72} = \left(2\frac{1}{6}\right) \times SPP_x \times k.$$

In particular embodiments, horizontal separation distances 70 and 72 may vary by up to 0.5%, 1%, 2%, 3%, or by any suitable percentage. Although this disclosure describes and illustrates particular mesh designs having particular conductive lines with particular horizontal separation distances, this disclosure contemplates any suitable mesh designs having any suitable conductive lines with any suitable horizontal separation distances.

In particular embodiments, the attenuation of light when passing through a conductive mesh may be referred to as a blocking of light or an optical transmission loss. In particular embodiments, it may be preferable for a mesh design, such as for example, the mesh designs illustrated in FIG. 14 or 15, to have an optical transmission loss of less than approximately 5%. As an example and not by way of limitation, a mesh design having a metal density of approximately 4% may block approximately 4% of incident light. In particular embodiments, an optical transmission loss of less than approximately 5% may be achieved with a mesh design having conductive lines with line widths of approximately 4 μm to 6 μm and diagonal length 90 or diagonal length 92 in the range of approximately 265-340 μm. As an example and not by way of limitation, an optical transmission loss of approximately 4% may be achieved with a mesh design having conductive-line widths of approximately 5 μm and diagonal length 90 or diagonal length 92 in the range of approximately 265-340 μm. In other particular embodiments, an optical transmission loss of less than approximately 5% may be achieved with a mesh design having conductive lines with line widths of approximately 2 μm to 3 μm and diagonal length 90 or diagonal length 92 in the range of approximately 132-170 μm. As an example and not by way of limitation, an optical transmission loss of approximately 4% may be achieved with a mesh design having conductive-line widths of approximately 2.5 μm and diagonal length 90 or diagonal length 92 in the range of approximately 132-170 μm. Although this disclosure describes and illustrates particular mesh patterns having particular conductive-line widths and particular diagonal lengths, this disclosure contemplates any suitable mesh patterns having any suitable conductive-line widths and any suitable diagonal lengths.

Figure 16:
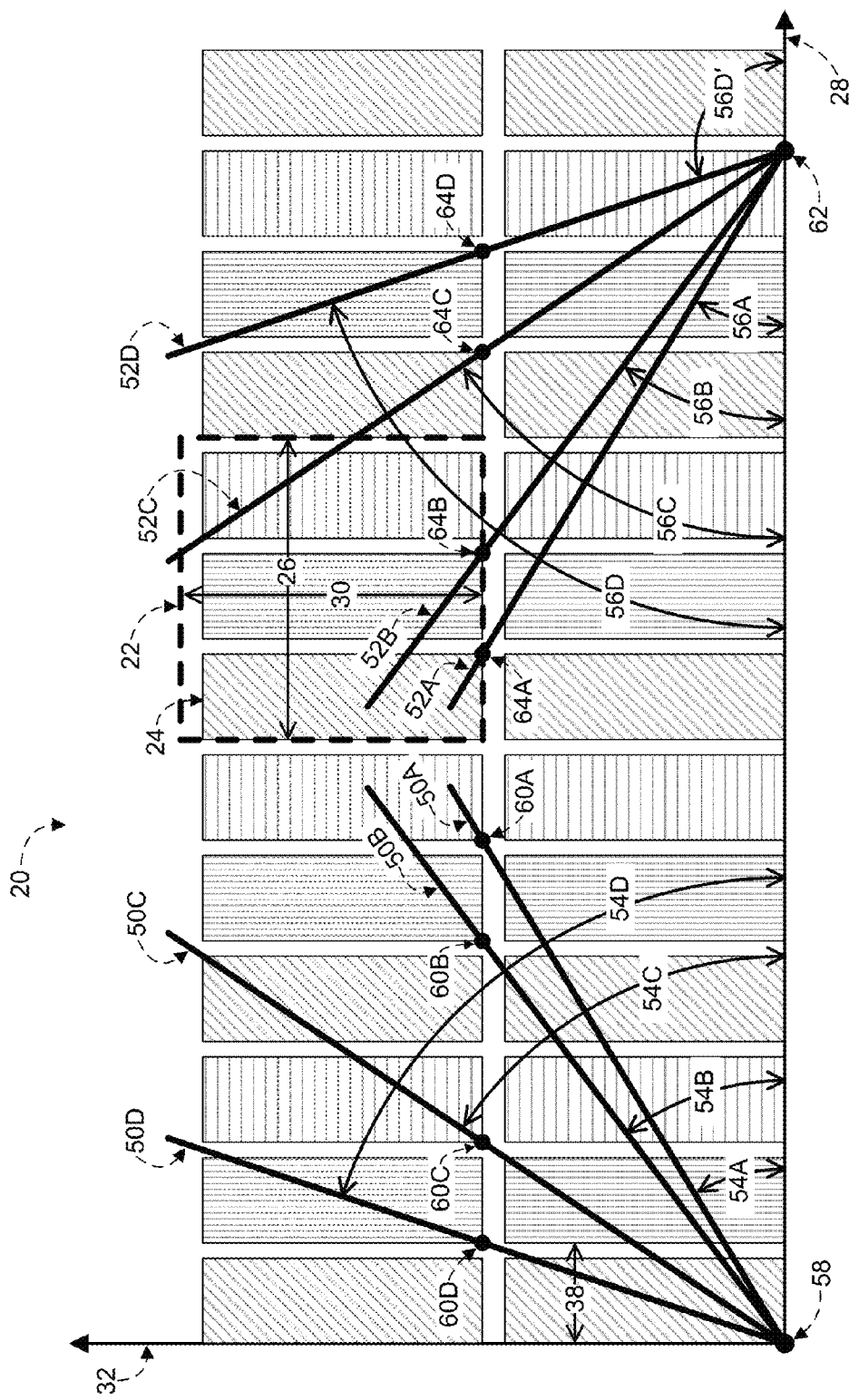
FIG. 16 illustrates another example portion of an example display with example conductive lines overlying the display portion.

FIG. 16 illustrates another example portion 20 of an example display with example conductive lines 50 and 52 overlying the display portion 20. FIG. 16 illustrates four example conductive lines 50A, 50B, 50C, and 50D oriented at angles 54A, 54B, 54C, and 54D, respectively, relative to horizontal axis 28. FIG. 16 also illustrates another four example conductive lines 52A, 52B, 52C, and 52D oriented at angles 56A, 56B, 56C, and 56D, respectively, relative to horizontal axis 28. Conductive lines 50 are oriented at angles 54 in a counterclockwise direction relative to horizontal axis 28, while conductive lines 52 are oriented at angles 56 in a clockwise direction relative to horizontal axis 28. In particular embodiments, a mesh design may include two sets of conductive lines, where the first set includes conductive lines that are substantially parallel and have a counterclockwise orientation with respect to horizontal axis 28 at an angle 54A, 54B, 54C, or 54D, and the second set includes conductive lines that are substantially parallel and have a clockwise orientation with respect to horizontal axis 28 at an angle 56A, 56B, 56C, or 56D.

In the example of FIG. 16, each angle 54 of conductive lines 50 may be illustrated by drawing lines that pass through reference point 58 and one of reference points 60A, 60B, 60C, or 60D. In FIG. 16, reference point 58 is located at a lower-left corner of a sub-pixel 24, and reference points 60A, 60B, 60C, or 60D are located at a lower-left corner of another sub-pixel 24 located one vertical pixel pitch 30 up and an integer number of horizontal sub-pixel pitches 38 over from reference point 58. Similarly, each angle 56 of conductive lines 52 may be illustrated by drawing lines that pass through reference point 62 and one of reference points 64A, 64B, 64C, or 64D. In the example of FIG. 16, reference point 62 is located at a lower-right corner of a sub-pixel 24, and reference points 64A, 64B, 64C, or 64D are located at a lower-right corner of another sub-pixel 24 located one vertical pixel pitch 30 up and an integer number of horizontal sub-pixel pitches 38 over from reference point 62.

In FIG. 16, the slope of a conductive line 50 may be defined as a vertical rise of conductive line 50 divided by a horizontal run of conductive line 50, and angle 54 can be found from the arctangent of the slope. In the example of FIG. 16, the vertical rise of conductive lines 50 is vertical pixel pitch 30 ($PP_y$), and the horizontal run of conductive lines 50 is an integer multiple of $SPP_x$ 38, which may be expressed as $m \times SPP_x$, where m is a positive integer. Since, as described above, $$SPP_x = \frac{1}{3} \times PP_x,$$

the horizontal run of conductive lines 50 may be expressed as $$m \times \frac{1}{3} \times PP_x.$$

As an example and not by way of limitation, for conductive line 50B in FIG. 16, m equals 4 since reference point 60B is located 4 horizontal sub-pixel pitches 38 over from reference point 58, and the horizontal run of conductive line 54B is $$\frac{4}{3} \times PP_x.$$

In particular embodiments, the slope of conductive lines 50 may be expressed as $$PP_y \Big/ \Big(m \times \frac{1}{3} \times PP_x\Big),$$

where m is a positive integer, and angle 54 ($\Theta_{54}$) can be found from the expression $$\theta_{54} = \arctan\Big[PP_y \Big/ \Big(m \times \frac{1}{3} \times PP_x\Big)\Big] = \arctan\Big[\frac{3}{m} \times \frac{PP_y}{PP_x}\Big].$$

In FIG. 16, for angles 54A, 54B, 54C, and 54D, m is equal to 5, 4, 2, and 1, respectively, and angles 54A, 54B, 54C, and 54D may be expressed as $$\theta_{54A} = \arctan\Big[\frac{3}{5} \times \frac{PP_y}{PP_x}\Big],$$

$$\theta_{54B} = \arctan\Big[\frac{3}{4} \times \frac{PP_y}{PP_x}\Big],$$

$$\theta_{54C} = \arctan\Big[\frac{3}{2} \times \frac{PP_y}{PP_x}\Big],$$

and $$\theta_{54D} = \arctan\Big[3 \times \frac{PP_y}{PP_x}\Big],$$

respectively. In particular embodiments, pixel 22 may have a substantially square shape, and $PP_x$ and $PP_y$ may be approximately equal. For such pixels 22 with a square shape, angles 54A, 54B, 54C, and 54D may then be expressed as $\theta_{54A}=\arctan(3/5)\approx 30.96°$, $\theta_{54B}=\arctan(3/4)\approx 36.87°$, $\theta_{54C}=\arctan(3/2)\approx 56.31°$, and $\theta_{54D}=\arctan(3)\approx 71.57°$, respectively.

In FIG. 16, the slope of a conductive line 52 may similarly be defined as a vertical rise of conductive line 52 divided by a horizontal run of conductive line 52, and angle 56 can be found from the arctangent of the slope. In the example of FIG. 16, the vertical rise of conductive lines 52 is vertical pixel pitch 30 (PP), and the horizontal run of conductive lines 50 is an integer multiple of $SPP_x$ 38, which may be expressed as $n \times SPP_x$, where n is a positive integer. Since, as described above, $$SPP_x = \frac{1}{3} \times PP_x,$$

the horizontal run of conductive lines 52 may be expressed as $$n \times \frac{1}{3} \times PP_x.$$

As an example and not by way of limitation, for conductive line 52C in FIG. 16, n equals 2 since reference point 64C is located 2 horizontal sub-pixel pitches 38 over from reference point 62, and the horizontal run of conductive line 52C is $$\frac{2}{3} \times PP_x.$$

In particular embodiments, the slope of conductive lines 52 may be expressed as $$PP_y \Big/ \Big(n \times \frac{1}{3} \times PP_x\Big),$$

where n is a positive integer, and angle 56 ($\theta_{56}$) can be found from the expression $$\theta_{56} = \arctan\left[PP_y \Big/ \left(n \times \frac{1}{3} \times PP_x\right)\right] = \arctan\left[\frac{3}{n} \times \frac{PP_y}{PP_x}\right].$$

In particular embodiments, the positive integers m and n may be referred to as angle parameters for a mesh pattern. In FIG. 16, for angles 56A, 56B, 56C, and 56D, n is equal to 5, 4, 2, and 1, respectively, and angles 56A, 56B, 56C, and 56D may be expressed as $$\theta_{56A} = \arctan\left[\frac{3}{5} \times \frac{PP_y}{PP_x}\right],$$

$$\theta_{56B} = \arctan\left[\frac{3}{4} \times \frac{PP_y}{PP_x}\right],$$

$$\theta_{56C} = \arctan\left[\frac{3}{2} \times \frac{PP_y}{PP_x}\right],$$

and $$\theta_{56D} = \arctan\left[3 \times \frac{PP_y}{PP_x}\right],$$

respectively. In particular embodiments, pixel 22 may have a substantially square shape, and $PP_x$ and $PP_y$ may be approximately equal. For such pixels 22 with a square shape, angles 56A, 56B, 56C, and 56D may then be expressed as $\theta_{56A}$=arctan(3/5)≅30.96°, $\theta_{56B}$=arctan(3/4)≅36.87°, $\theta_{56C}$=arctan(3/2)≅56.31°, and $\theta_{56D}$=arctan(3)≅71.57°, respectively. In particular embodiments, angles 54A, 54B, 54C, and 54D may have the same magnitude as angles 56A, 56B, 56C, and 56D, respectively. In particular embodiments, a mesh design may include angles 54 and 56 with approximately the same magnitude, and the associated conductive lines 50 and 52 may appear to be reflected about a vertical axis.

In FIG. 16, conductive lines 52 may be described as having a $\theta_{56}$ clockwise orientation with respect to horizontal axis 28. In particular embodiments, conductive lines 52 may be described as having a $\theta'_6$ counterclockwise orientation with respect to horizontal axis 28, where $\theta'_6$ is the supplementary angle of $\theta_{56}$ such that $\theta'_{56}$=180°−$\theta_{56}$. In FIG. 16, angle 56D is indicated along with its supplementary angle 56D'. As an example and not by way of limitation, if pixel 22 has a substantially square shape, conductive line 52A may be described as having a $\theta'_{56A}$ counterclockwise orientation with respect to horizontal axis, where $\theta'_{56A}$≅180°−30.96°=149.04°. Similarly, for substantially square pixels 22, conductive lines 52B, 52C, and 52D may be described as having a $\theta'_6$ counterclockwise orientation with respect to horizontal axis, where $\theta'_{56B}$≅143.13°, $\theta'_{56C}$≅123.69°, and $\theta'_{56D}$≅108.43°, respectively.

In particular embodiments, a mesh design may be formed or described by selecting an angle 54 for a first set of conductive lines 50 and selecting another angle 56 for a second set of conductive lines 52. For the first set of conductive lines 50 of a mesh design, angle 54 may be determined from the expression above for $\theta_{54}$, where m is 1, 2, 4, 5, or any suitable positive integer. Similarly, for the second set of conductive lines 52 of a mesh design, angle 56 may be determined from the expression above for $\theta_{56}$, where n is 1, 2, 4, 5, or any suitable positive integer. In particular embodiments, m and n may be the same, and angles $\theta_{54}$ and $\theta_{56}$ may be the same. In particular embodiments, m and n may be different, and angles $\theta_{54}$ and $\theta_{56}$ may be different. In particular embodiments, conductive lines 50 and 52 may make up part of a mesh pattern of a touch sensor and angles $\theta_{54}$ and $\theta_{56}$ may vary by up to 0.2°, 0.5°, 1°, or any suitable angular amount from the values calculated in the expressions above without substantially degrading the optical performance of the mesh pattern. In particular embodiments, a mesh pattern for a display with substantially square pixels 22 may include conductive lines 50 with angle 54 that is within 1° of 30.96°, 36.87°, 56.31°, or 71.57° and conductive lines 52 with angle 56 that is within 1° of 30.96°, 36.87°, 56.31°, or 71.57°. As an example and not by way of limitation, a mesh pattern for a display with substantially square pixels 22 may include conductive lines 50 with angle 54 that is within 1° of 36.87° (e.g., between 35.87° and 37.87°), and conductive lines 52 with angle 56 that is within 1° of 56.31° (e.g., between 55.31° and 57.31°). As another example and not by way of limitation, a mesh pattern for a display with substantially square pixels 22 may include conductive lines 50 and 52 with angles 54 and 56, respectively, that are within 1° of 36.87°. As other examples and not by way of limitation, a mesh pattern may include conductive lines 50 and 52 that are within 1° of any of the following combinations of angles 54 and 56, respectively: 30.96° and 56.31°; 36.87° and 71.57°; or 30.96° and 71.57°. Although this disclosure describes and illustrates particular conductive lines having particular angles with respect to a particular axis of a display, this disclosure contemplates any suitable conductive lines having any suitable angles with respect to any suitable axes of a display.

FIGS. 17-20 illustrate example mesh designs overlying other example portions 20 of example displays. Display portions 20 include pixels 22 arranged along horizontal axis 28 and vertical axis 32. In FIGS. 17-20, each pixel 22 has horizontal pixel pitch 26 (Pr) and vertical pixel pitch 30 (PP), and each pixel 22 includes three sub-pixels 24. Pixels 22 in FIGS. 17-20 are substantially square so that $PP_x$ and $PP_y$ are approximately the same. The example mesh designs in FIGS. 17-20 include conductive lines 50 and 52, and conductive lines 50 and 52 may be FLM and may make up part of a mesh pattern of an electrode of a touch sensor. Conductive lines 50 in each of FIGS. 17-20 are substantially parallel to each other, and each conductive line 50 forms an angle 54 relative to horizontal axis 28. Additionally, conductive lines 50 are substantially evenly spaced from one another with adjacent conductive lines 50 having an equal horizontal separation distance 70 along horizontal axis 28. Conductive lines 52 in FIGS. 17-20 are also substantially parallel to each other, forming an angle 56 relative to horizontal axis 28. Conductive lines 52 are also substantially evenly spaced from one another with adjacent conductive lines 52 having an equal horizontal separation distance 72.

Figure 17:
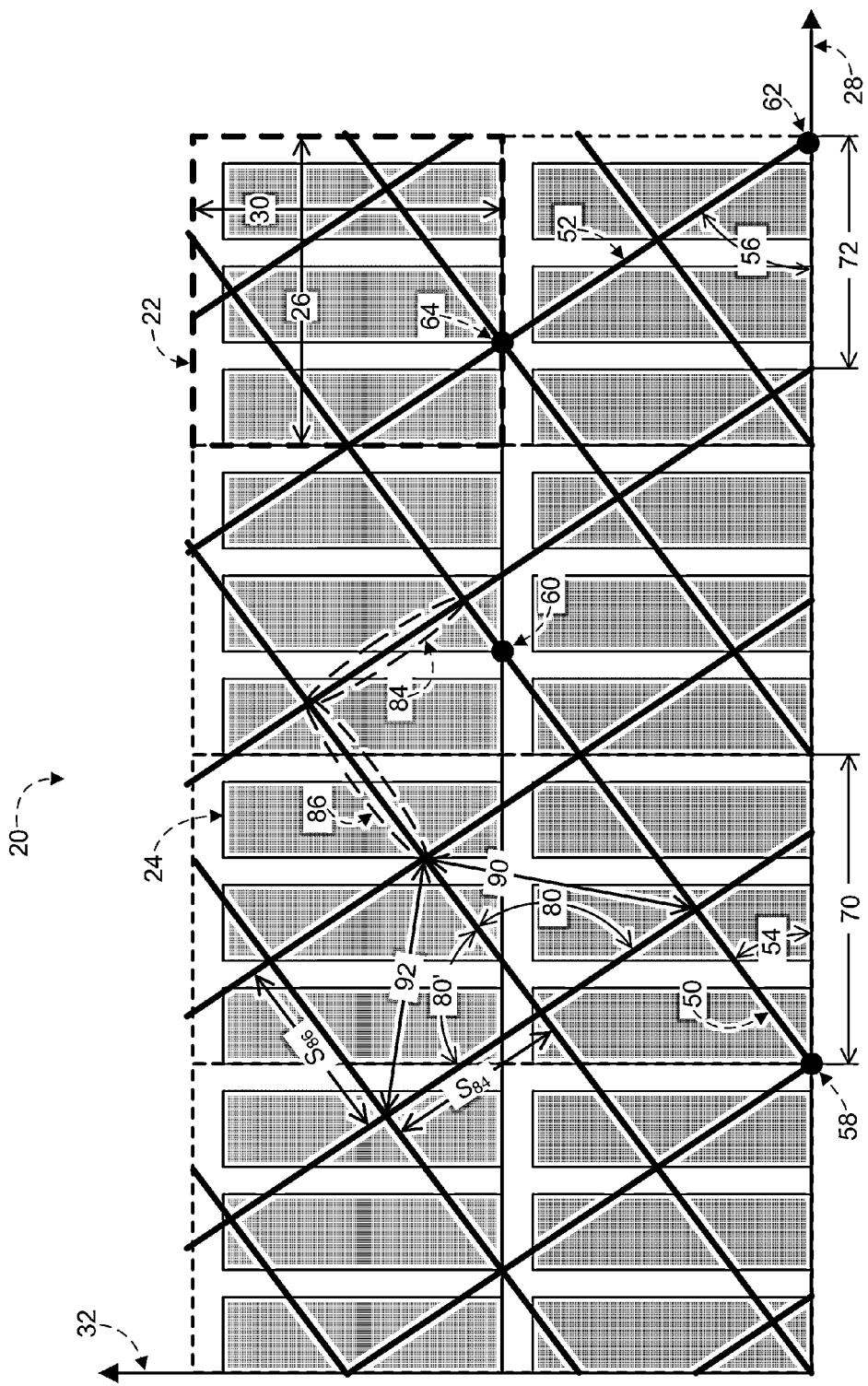
FIGS. 17-20 illustrate example mesh designs overlying other example portions of example displays.

In FIGS. 17-20, conductive lines 50 have a horizontal separation distance 70 along horizontal axis 28 that may be expressed as $D_{70}$=k×$PP_x$, where $D_{70}$ is horizontal separation distance 70 of conductive lines 50, k is a positive integer, and $PP_x$ is horizontal pixel pitch 26. Similarly, conductive lines 52 have a horizontal separation distance 72 along horizontal axis that may be expressed as $$D_{72} = \frac{3}{4} \times k \times PP_x$$

where $D_{72}$ is horizontal separation distance 72 of conductive lines 52 and k is the same positive integer used to determine $D_{70}$. In the example of FIG. 17, the line-separation parameter k equals 1 so that horizontal separation distance 70 is approximately $PP_x$, and horizontal separation distance 72 is approximately $$\frac{3}{4} \times PP_x.$$

FIG. 17 illustrates an example mesh design overlying another example portion 20 of another example display. As described above, angle 54 in FIG. 17 may be expressed as $$\theta_{54} = \arctan\left[\frac{3}{m} \times \frac{PP_y}{PP_x}\right].$$

In FIG. 17, $PP_x \cong PP_y$, and in the expression for angle 54, m equals 4, so that angle 54 is approximately 36.87°. Similarly, angle 56 in FIG. 17 may be expressed as $$\theta_{56} = \arctan\left[\frac{3}{n} \times \frac{PP_y}{PP_x}\right],$$

where n equals 2, so that angle 56 is approximately 56.31°. Angle 80 ($\theta_{80}$) equals the sum of angles 54 and 56, or $\theta_{80} = \theta_{54} + \theta_{56} \cong 36.87° + 56.31° = 93.18°$. Angle 80' ($\theta'_{80}$) is the supplement to angle 80, so that angle 80' is $\theta'_{80} = 180° - \theta_{80} \cong 86.82°$. In particular embodiments, the mesh design of FIG. 17, where k=1, m=4, and n=2, may be preferable for a display where $PP_x$ and $PP_y$ are in the range of approximately 340 μm to 375 μm. As an example and not by way of limitation, pixels 22 in FIG. 17 may have a height and width of approximately 375 μm so that $PP_x \cong PP_y \cong 375$ μm. Horizontal separation distance 70 is approximately $D_{70} \cong 375$ μm, and horizontal separation distance 72 is approximately $$D_{72} = \frac{3}{4} \times (375 \text{ μm}) \cong 281.3 \text{ μm}.$$

From the expressions above for the lengths of segments 84 and 86, length of line segment 84 is approximately $$S_{84} = D_{70} \times \frac{\sin\theta_{54}}{\sin\theta_{80}} \cong 225.4 \text{ μm},$$

and length of line segment 86 is approximately $$S_{86} = D_{72} \times \frac{\sin\theta_{56}}{\sin\theta_{80}} \cong 234.4 \text{ μm}.$$

From the expressions for diagonal lengths 90 and 92 discussed above, diagonal length 90 is approximately $D_{90} \cong 334.0$ μm, and diagonal length 92 is approximately $D_{92} \cong 316.0$ μm.

In particular embodiments, a single mesh design, such as for example the mesh designs of FIGS. 17-20, may be used with two or more different displays, where the two or more different displays have substantially the same horizontal pixel pitch 26 and substantially the same vertical pixel pitch 30. In particular embodiments, a single mesh design may be used with two or more different displays even though the two or more different displays may have sub-pixels 24 with different shapes or dimensions. As an example and not by way of limitation, the mesh design of FIG. 17 may be used with two displays each having a pixel height and width of approximately 375 μm, where one of the displays has rectangular-shaped sub-pixels 24 and the other display has chevron-shaped sub-pixels 24. As another example and not by way of limitation, the mesh design of FIG. 17 may be used with two displays each having $PP_x \cong PP_y \cong 375$ μm, where one of the displays has sub-pixels 24 with a sub-pixel height 44 of $SPD_y \cong 360$ μm and the other display has a sub-pixel height 44 of $SPD_y \cong 320$ μm. Although this disclosure describes and illustrates a particular mesh design that may be used with two or more different displays, this disclosure contemplates any suitable mesh designs that may be used with any suitable number of suitable different displays.

Figure 18:
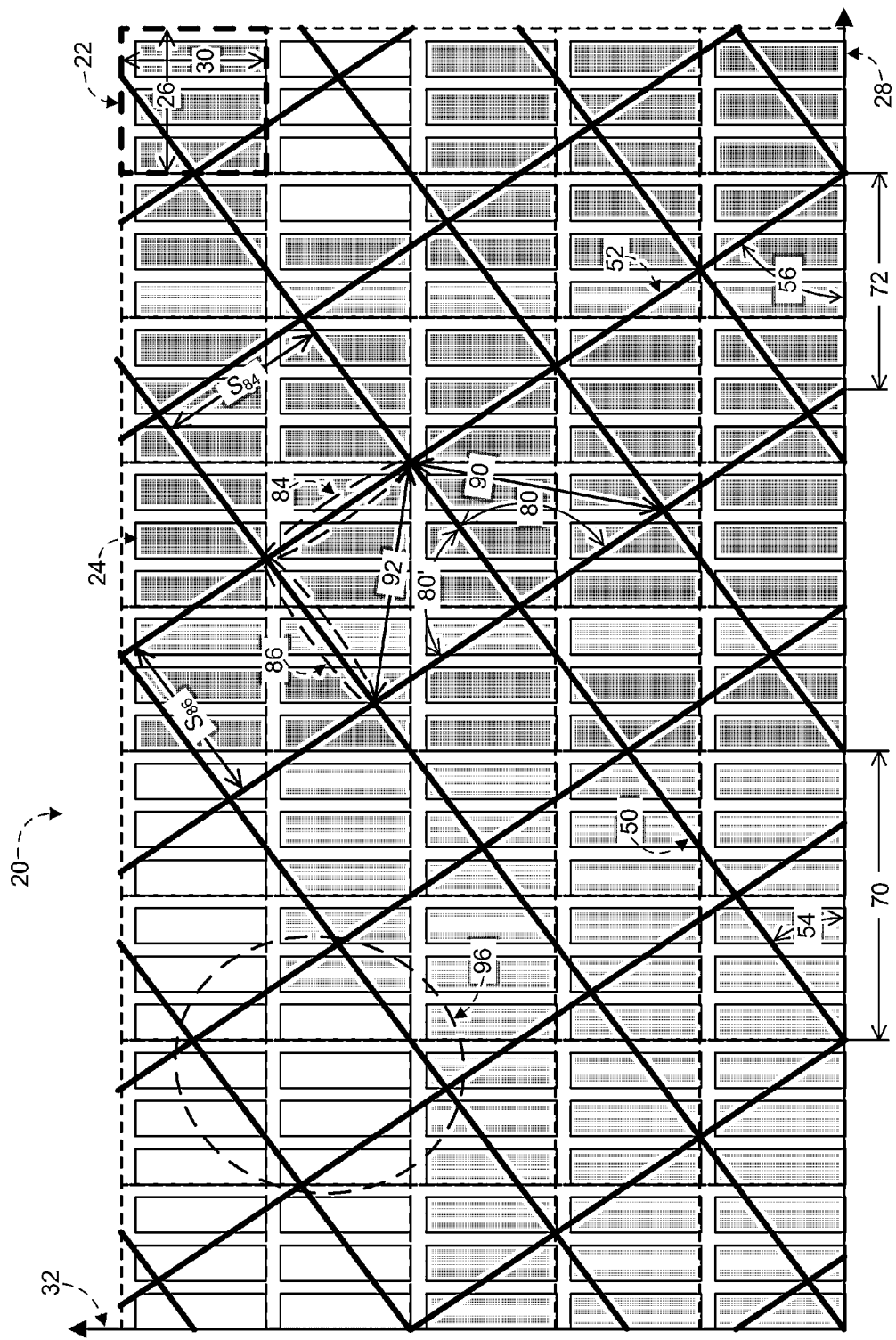

FIG. 18 illustrates another example mesh design overlying another example portion 20 of another example display. In FIGS. 17 and 18, the angle parameters are m=4 and n=2. Correspondingly, angles 54 in FIGS. 17 and 18 are approximately the same, and angles 56 in FIGS. 17 and 18 are also approximately the same. In the example of FIG. 18, the line-separation parameter k equals 2 so that horizontal separation distance 70 is approximately $2 \times PP_x$, and horizontal separation distance 72 is approximately $$\frac{3}{2} \times PP_x.$$

In particular embodiments, the mesh design of FIG. 18, where k=2, m=4, and n=2, may be preferable for a display where $PP_x$ and $PP_y$ are in the range of approximately 170 μm to 190 μm. As an example and not by way of limitation, pixels 22 in FIG. 18 may have a height and width of approximately 190 μm so that $PP_x \cong PP_y \cong 190$ μm. Horizontal separation distance 70 is approximately $D_{70} \cong 380$ μm, and horizontal separation distance 72 is approximately $D_{72} \cong 285$ μm. Length of line segment 84 is approximately $S_{84} \cong 228.4$ μm, and length of line segment 86 is approximately $S_{86} \cong 237.5$ μm. Diagonal length 90 is approximately $D_{90} \cong 338.5$ μm, and diagonal length 92 is approximately $D_{92} \cong 320.2$ μm.

Figure 19:
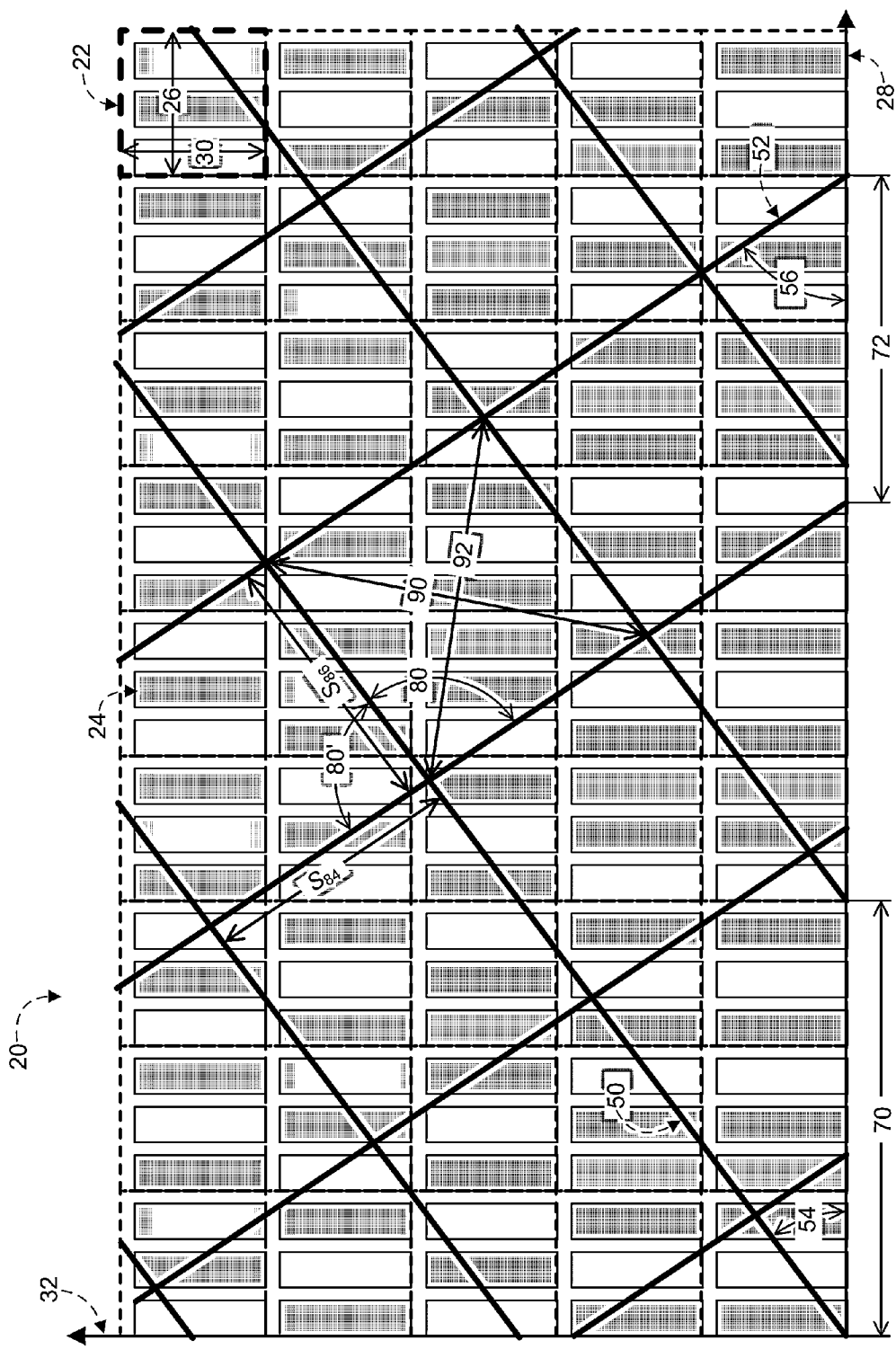

FIG. 19 illustrates another example mesh design overlying another example portion 20 of another example display. In FIGS. 17-19, the angle parameters are m=4 and n=2. Correspondingly, angles 54 in FIGS. 17-19 are approximately the same, and angles 56 in FIGS. 17-19 are also approximately the same. In the example of FIG. 19, the line-separation parameter k equals 3 so that horizontal separation distance 70 is approximately $3 \times PP_x$, and horizontal separation distance 72 is approximately $$\frac{9}{4} \times PP_x.$$

In particular embodiments, the mesh design of FIG. 19, where k=3, m=4, and n=2, may be preferable for a display where $PP_x$ and $PP_y$ are in the range of approximately 115 μm to 130 μm. As an example and not by way of limitation, pixels 22 in FIG. 19 may have height 30 and width 26 of approximately 125 μm so that $PP_x \cong PP_y \cong 125$ μm. For such an example mesh pattern, horizontal separation distance 70 is approximately $D_{70} \cong 375$ µm, and horizontal separation distance 72 is approximately $D_{72} \cong 281.3$ µm. Length of line segment 84 is approximately $S_{84} \cong 225.4$ µm, and length of line segment 86 is approximately $S_{86} \cong 234.4$ µm. Diagonal length 90 is approximately $D_{90} \cong 334.0$ µm, and diagonal length 92 is approximately $D_{92} \cong 316.0$ µm.

Figure 20:
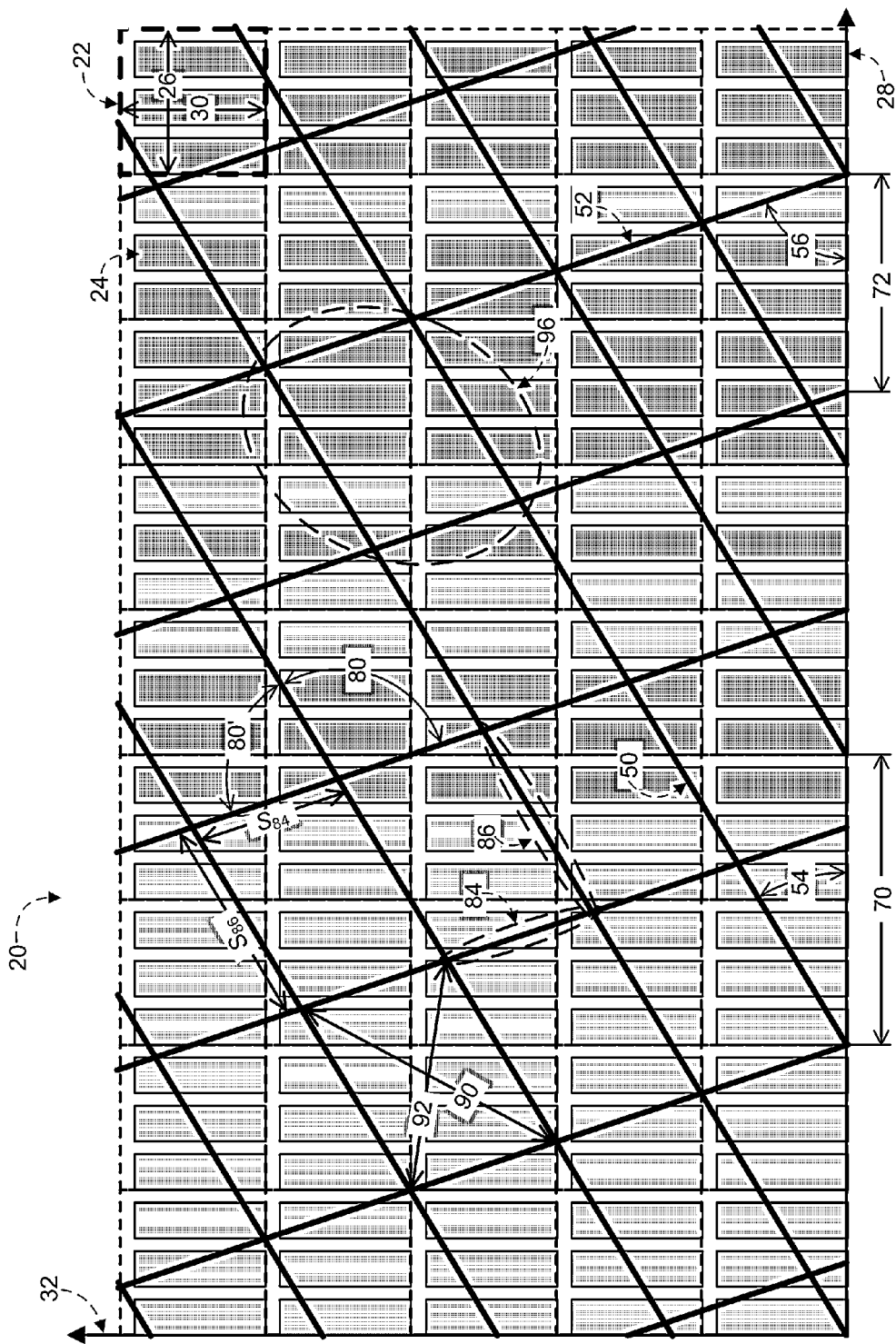

FIG. 20 illustrates another example mesh design overlying another example portion 20 of another example display. As described above, angle 54 in FIG. 20 may be expressed as $$\theta_{54} = \arctan\left[\frac{3}{m} \times \frac{PP_y}{PP_x}\right].$$

In FIG. 20, $PP_x \cong PP_y$, and in the expression for angle 54, m equals 5, so that angle 54 is approximately 30.96°. Similarly, angle 56 in FIG. 20 may be expressed as $$\theta_{56} = \arctan\left[\frac{3}{n} \times \frac{PP_y}{PP_x}\right],$$

where n equals 1, so that angle 56 is approximately 71.57°. Angle 80 ($\theta_{80}$) equals the sum of angles 54 and 56, or approximately 102.53°, and angle 80' ($\theta'_{80}$) is approximately 77.47°. In the example of FIG. 20, the line-separation parameter k equals 2 so that horizontal separation distance 70 is approximately $2 \times PP_x$, and horizontal separation distance 72 is approximately $$\frac{3}{2} \times PP_x.$$

In particular embodiments, the mesh design of FIG. 20, where k=2, m=5, and n=1, may be preferable for a display where $PP_x$ and $PP_y$ are in the range of approximately 160 µm to 168 µm. As an example and not by way of limitation, pixels 22 in FIG. 20 may have height 30 and width 26 of approximately 168 µm so that $PP_x \cong PP_y \cong 168$ µm. For such an example mesh pattern, horizontal separation distance 70 is approximately $D_{70} \cong 336.0$ µm, and horizontal separation distance 72 is approximately $D_{72} \cong 252.0$ µm. Length of line segment 84 is approximately $S_{84} \cong 177.1$ µm, and length of line segment 86 is approximately $S_{86} \cong 244.9$ µm. Diagonal length 90 is approximately $D_{90} \cong 331.8$ µm, and diagonal length 92 is approximately $D_{92} \cong 269.3$ µm. Although this disclosure describes and illustrates particular mesh patterns having particular angle parameters m and n and particular line-separation parameters k, this disclosure contemplates any suitable mesh patterns having any suitable angle parameters and any suitable line-separation parameters.

Figure 21:
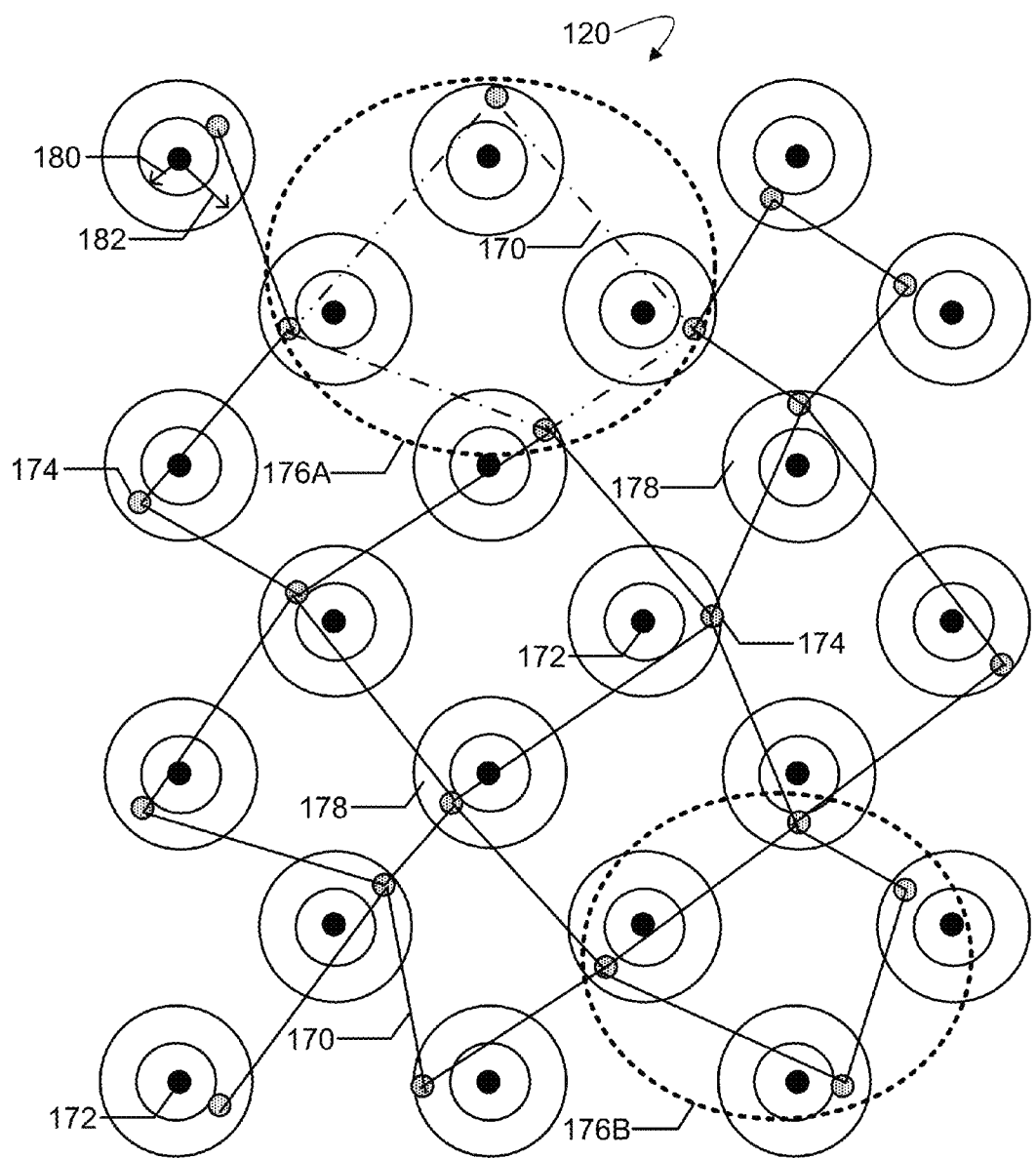
FIG. 21 illustrates example mesh cells with example vertices having substantially randomized locations.

FIG. 21 illustrates example mesh cells with example vertices having substantially randomized locations. Although this disclosure describes and illustrates a particular distribution of seed locations, this disclosure contemplates any suitable distribution of seed locations. Moreover, although this disclosure describes and illustrates particular vertices defining particular mesh cells or microfeatures in particular configurations, this disclosure contemplates any suitable vertices defining any suitable mesh cells or microfeatures in any suitable configuration. Area 120 may correspond to a portion of a drive or sense electrode (or other element) of a touch sensor. In a touch sensor, mesh segments 170 connecting pairs of adjacent vertices 174 may correspond to fine lines of metal (such as for example copper, silver, or a copper- or silver-based material) or other conductive material with a thickness of approximately 1 µm or less and a width of approximately 5 µm or less. Seed locations 172, on the other hand, do not correspond to any conductive or other material in the touch sensor. Instead, they may serve as a basis to determine at least in part the arrangement of vertices 174, as described below. In particular embodiments, mesh cells 176 may be defined at least in part by two pairs of opposing vertices 174 and associated mesh segments 170. Although this disclosure describes and illustrates particular mesh cells with a particular number and configuration of vertices and mesh segments, this disclosure contemplates any suitable mesh cell with any suitable number of vertices and mesh segments.

In particular embodiments, seed locations 172 may be distributed throughout area 120 in a two-dimensional (2D) substantially regularly spaced pattern. In particular embodiments, seed locations 172 may be distributed based at least in part on vertices 174 of an initial mesh cell (e.g. 176A). As an example and not by way of limitation, seed locations 172 of the initial mesh cell (e.g. 176A) may have an initial distribution. As described below, vertices 174 of the initial mesh cell (e.g. 176A) may be determined through an annulus 178 of each vertex 174 of the initial mesh cell. Furthermore, seed locations 172 of subsequent mesh cells (e.g. 176B) may be determined based at least in part on the vertices 174 of the initial mesh cell (e.g. 176A). Although this disclosure describes and illustrates particular distribution of seed locations, this disclosure contemplates any suitable distribution of seed locations, such as for example a substantially random distribution.

Vertices 174 of mesh cells 176A-B may be arranged in a substantially randomized pattern that may reduce the occurrence of repeating patterns or frequencies among mesh segments 170, which may in turn reduce the occurrence of moiré patterns with respect to a display visible through area 120. In particular embodiments, each seed location 172 may have an associated annulus 178 substantially centered about each seed location 172, and annulus 178 may be defined by an associated minimum 180 and maximum 182 pre-determined radii. As an example and not by way of limitation, a dimension of minimum 180 and maximum 182 pre-determined radii may be determined based at least in part on one or more dimensions of a display underneath area 120. In particular embodiments, a location of each vertex 174 may be substantially randomly distributed within the annulus 178 associated with each seed location 172. Furthermore, mesh segments 170 of conductive material may couple adjacent pairs of vertices 174 as described above.

In particular embodiments, the amount of randomization applied to seed 172 to determine the location of a vertex 174 may be adjusted depending on one or more dimensions of a display underneath area 120. In particular embodiments, the amount of randomization may be increased by increasing the size or area of annulus 178. As an example and not by way of limitation, the amount of randomization may be increased by increasing maximum radius 182 or decreasing minimum radius 180. Conversely, in particular embodiments, the amount of randomization may be decreased by decreasing the size or area of annulus 178, such as for example, by decreasing maximum radius 182 or increasing minimum radius 180. In particular embodiments, a mesh design for a display having a relatively small pixel pitch may include a relatively small amount of randomization, and a mesh design for a display having a relatively large pixel pitch may include a relatively large amount of randomization.

Figure 22:
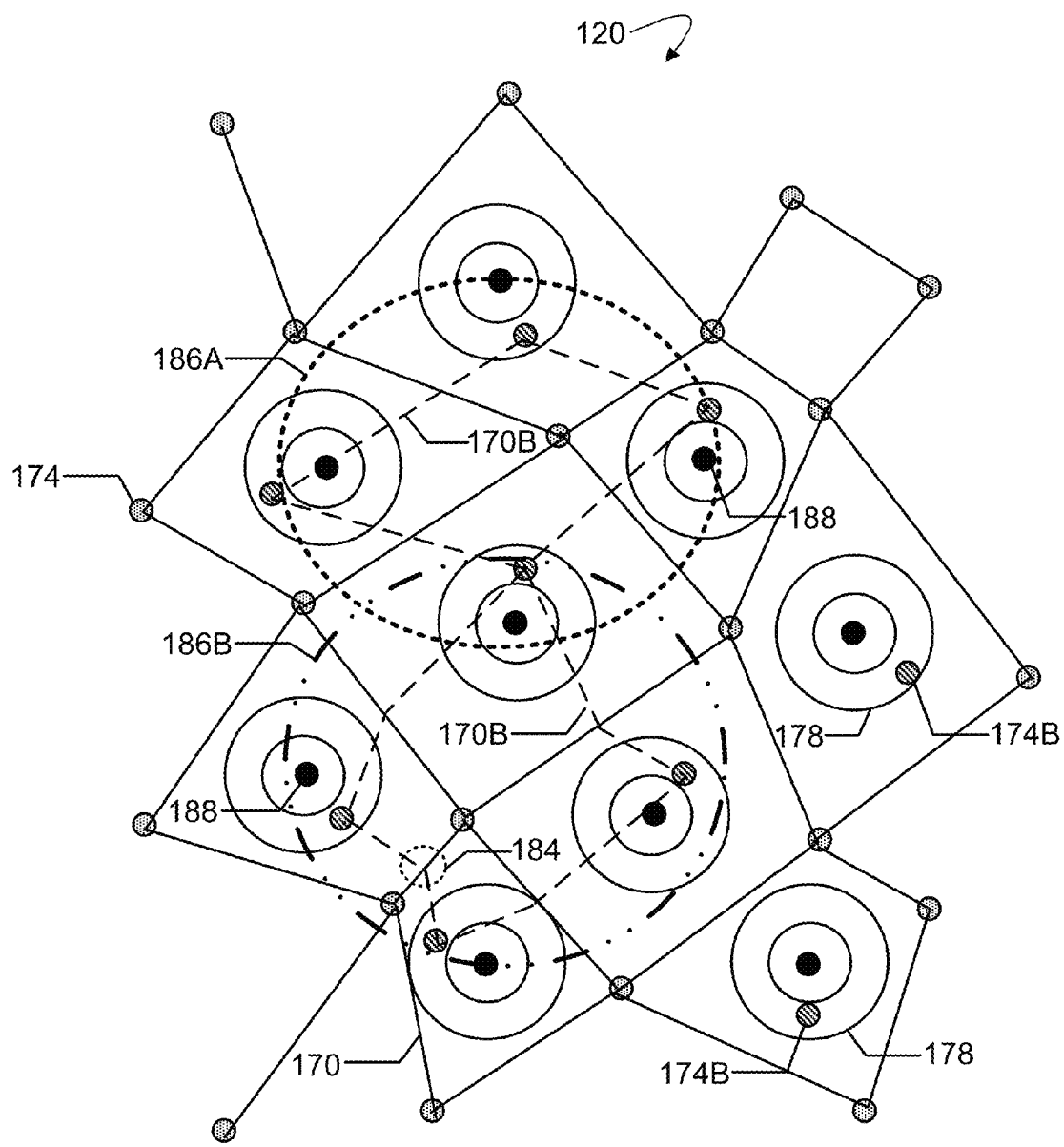
FIG. 22 illustrates an example dual-layer mesh pattern with example vertices having substantially randomized locations.

FIG. 22 illustrates an example dual-layer mesh pattern with example vertices having substantially randomized locations. The example of FIG. 21 illustrates a single-sided implementation, but this disclosure contemplates any suitable multi-sided implementation and is not limited to a single-sided implementation. As described above, area 120 may correspond to a portion of a drive or sense electrode (or other element) of a touch sensor. In particular embodiments, a dual-layer mesh pattern over area 120 may include a second mesh of conductive material separated from a first mesh of conductive material at least by a thickness of a dielectric layer. As an example and not by way of limitation, a first conductive mesh may be formed on a first substrate and a second conductive mesh may be formed on a second substrate. As another example, the first and second conductive meshes may be formed on a surface of a substrate with a layer of dielectric material at locations where one or more mesh segments of the second conductive mesh overlap a mesh segment of the first conductive mesh. Furthermore, the first conductive mesh may correspond to at least a portion of a drive electrode and the second conductive mesh may correspond to at least a portion of a sense electrode of a touch sensor or vice versa.

In particular embodiments, seed locations 188, and therefore one or more vertices 174B, of the second conductive mesh may be distributed based at least in part on the location of mesh cells of the first conductive mesh. In FIG. 22, the first conductive mesh, as illustrated by segments 170 and vertices 174, is the conductive mesh of FIG. 21, and the second conductive mesh is determined based at least in part on the mesh cells of the first conductive mesh. As an example and not by way of limitation, the distribution of seed locations 188 of the second conductive mesh may be based at least in part on a centroid of mesh cells of the first conductive mesh defined by vertices 174 as illustrated in the example of FIG. 22. As described above, each seed location 188 of the second conductive mesh may have an associated annulus 178. As an example and not by way of limitation, the radii of annuli 178 associated with seed locations 188 may be substantially equal to the pre-determined radii of the annuli, illustrated in the example of FIG. 21, of the first conductive mesh. In particular embodiments, a location of each vertex 174B of the second conductive mesh may be substantially randomly distributed within the annulus 178 associated with each seed location 188.

As described in regard to the example of FIG. 22, mesh segments 170B of conductive material may couple adjacent pairs of vertices 174B of the second conductive mesh. In particular embodiments, one or more mesh cells 186A of the second conductive mesh may be formed by coupling adjacent pairs of vertices 174B with a minimum-length mesh segment 170B. In particular embodiments, one or more mesh cells 186B of the second conductive mesh may be formed by coupling adjacent pairs of vertices 174B with one or more mesh segments 170B that overlap a mid-point location 184 of a mesh segment of the first conductive mesh, thereby forming a multi-segmented coupling between adjacent pairs of vertices 174B.

Figure 23:
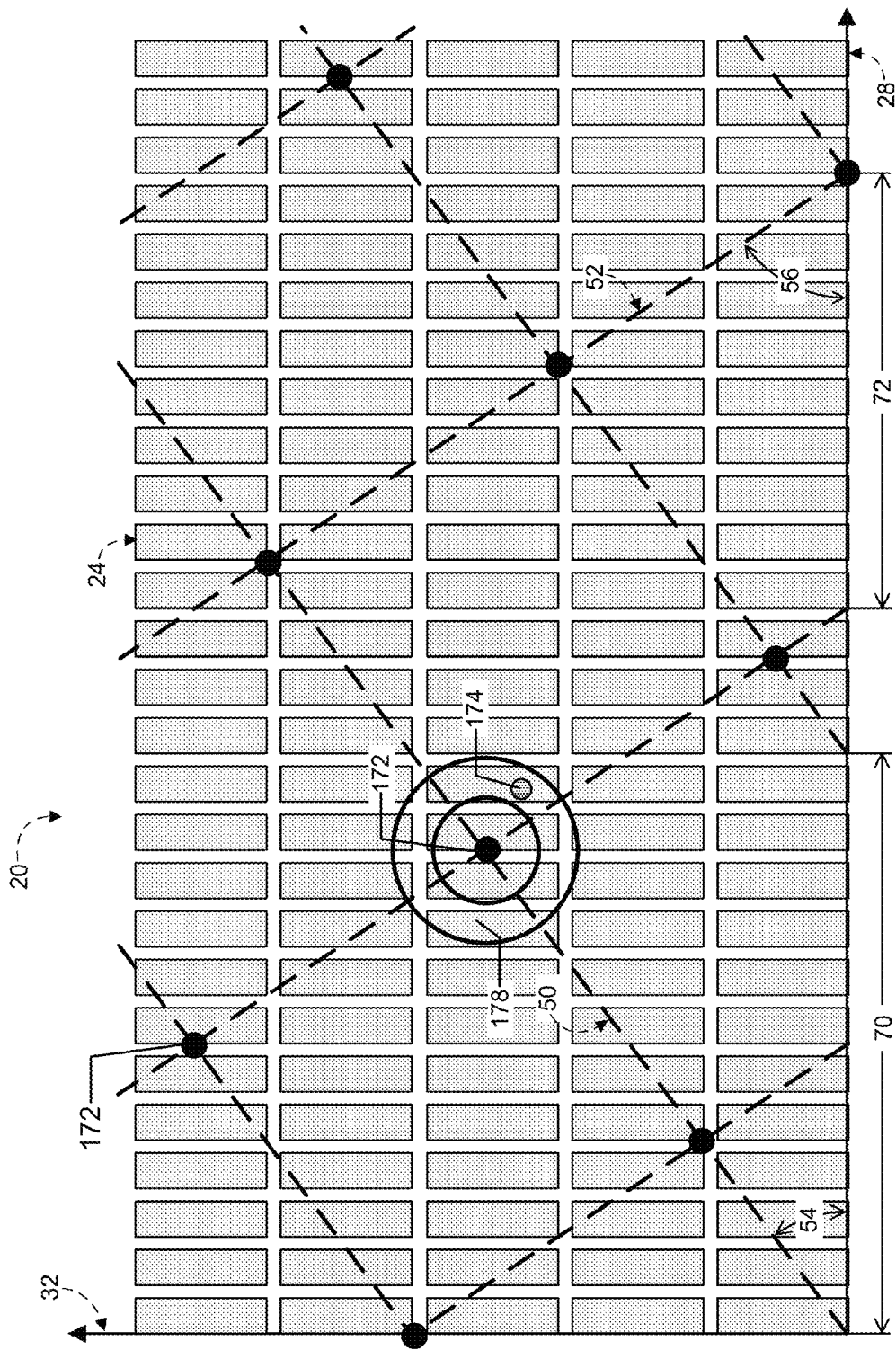
FIG. 23 illustrates an example placement of example seed locations relative to an example display portion.

FIG. 23 illustrates an example placement of example seed locations 172 relative to an example display portion 20. In particular embodiments, seed locations 172 may be determined based at least in part on one or more dimensions of a display underneath the touch sensor. In particular embodiments, seed locations 172 may be determined based at least in part on intersection points of lines 50 and 52 of a mesh design, such as for example, any of the mesh designs described or illustrated above. In the example of FIG. 23, lines 50 and 52 are not conductive lines but represent lines of a mesh design, where angles 54 and 56 and spacings 70 and 72 may be determined in any suitable manner. In FIG. 23, intersection points of lines 50 and 52 are used to identify seed locations 172. Once seed locations 172 are identified, a location of a vertex 174 may be identified by randomly selecting a vertex point 174 within annulus 178 constructed around seed location 172.

Figure 24:
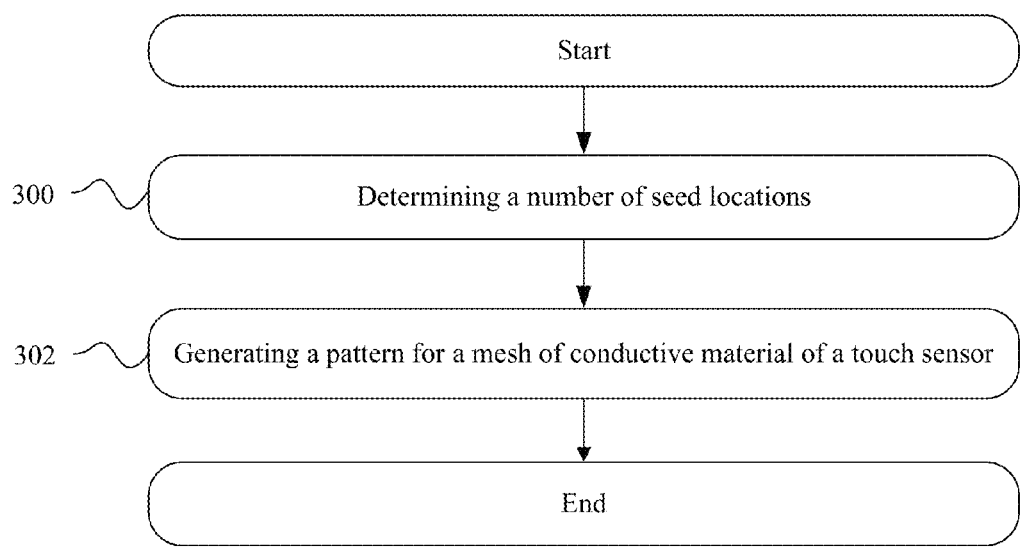
FIG. 24 illustrates an example method for designing a conductive mesh with randomized vertices.

FIG. 24 illustrates an example method for designing a conductive mesh with randomized vertices. The method may start at step 300, where a computing device may determine a number of seed locations. In particular embodiments, the seed locations may be a regularly spaced 2D pattern that may be determined at least in part on one or more dimensions of a display. At step 302, the computing device may generate a pattern for a mesh of conductive material of a touch sensor at least in part by determining a number of vertices of a number of mesh cells of the mesh of conductive material, at which point the method may end. In particular embodiments, each of the vertices may have a substantially randomized location within an annulus centered at one of the seed locations. Although this disclosure describes and illustrates particular steps of the method of FIG. 24 as occurring in a particular order, this disclosure contemplates any suitable steps of the method of FIG. 24 occurring in any suitable order. Particular embodiments may repeat one or more steps of the method of FIG. 24, where appropriate. Moreover, although this disclosure describes and illustrates an example method for designing a conductive mesh with randomized vertices including the particular steps of the method of FIG. 24, this disclosure contemplates any suitable method for designing a conductive mesh with randomized vertices including any suitable steps, which may include all, some, or none of the steps of the method of FIG. 24, where appropriate. Moreover, although this disclosure describes and illustrates particular components carrying out particular steps of the method of FIG. 24, this disclosure contemplates any suitable combination of any suitable components carrying out any suitable steps of the method of FIG. 24.

Figure 25:
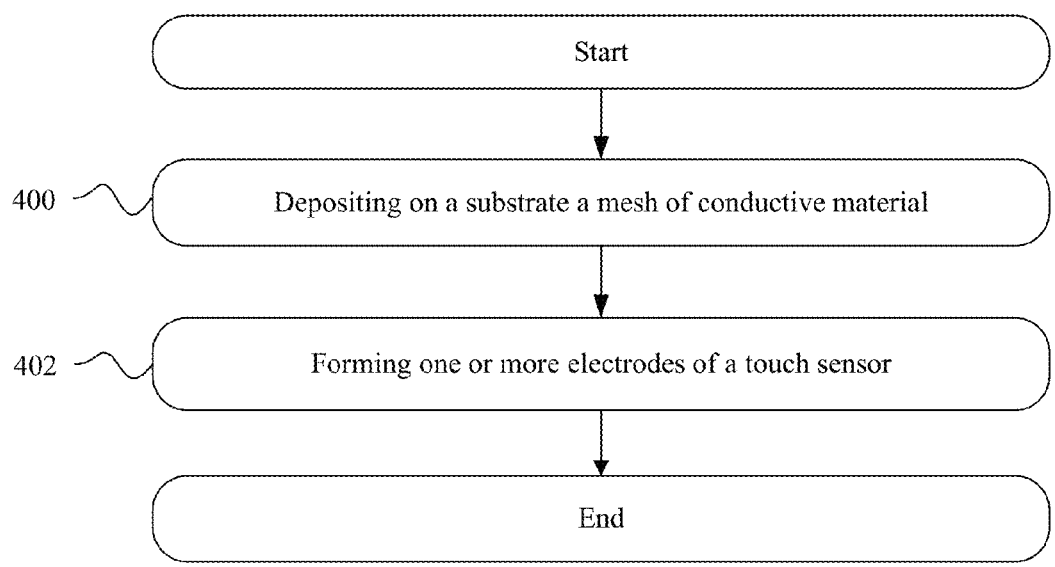
FIG. 25 illustrates an example method for forming electrodes of a touch sensor.

FIG. 25 illustrates an example method for forming one or more electrodes of a touch sensor. The method may start at step 400 where a mesh of conductive material that includes first and second lines of conductive material is deposited on a substrate. The lines of conductive material are configured to extend across a display. In particular embodiments, the first and second lines have first and second angles, respectively, and first and second horizontal separation distances, respectively, that may be determined in any suitable manner, such as for example, by any of the above-described manners. This disclosure contemplates any suitable technique for depositing a mesh of conductive material on a substrate, such as for example, printing of a mesh onto a substrate, evaporation, sputtering, physical vapor deposition, or chemical vapor deposition. At step 402, one or more electrodes of a touch sensor may be formed from the mesh of conductive material, at which point the method may end. This disclosure contemplates any suitable technique for forming electrodes from a mesh of conductive material, such as for example, etching, cutting, or ablating. Although this disclosure describes and illustrates particular steps of the method of FIG. 25 as occurring in a particular order, this disclosure contemplates any suitable steps of the method of FIG. 25 occurring in any suitable order. Particular embodiments may repeat one or more steps of the method of FIG.

25, where appropriate. Moreover, although this disclosure describes and illustrates an example method for forming electrodes of a touch sensor including the particular steps of the method of FIG. 25, this disclosure contemplates any suitable method for forming electrodes of a touch sensor including any suitable steps, which may include all, some, or none of the steps of the method of FIG. 25, where appropriate. Moreover, although this disclosure describes and illustrates particular components carrying out particular steps of the method of FIG. 25, this disclosure contemplates any suitable combination of any suitable components carrying out any suitable steps of the method of FIG. 25.

Figure 26:
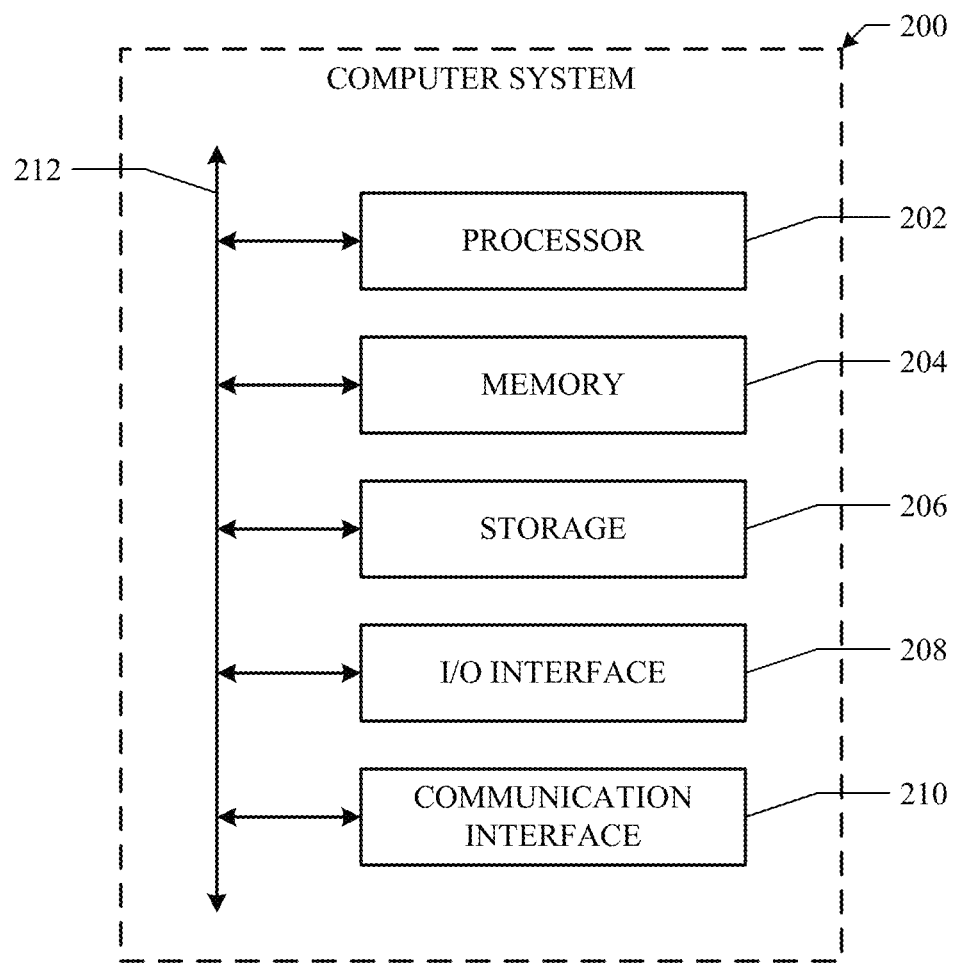
FIG. 26 illustrates an example computer system.

FIG. 26 illustrates an example computer system 200. In particular embodiments, one or more computer systems 200 perform one or more steps of one or more methods described or illustrated herein. In particular embodiments, one or more computer systems 200 provide functionality described or illustrated herein. In particular embodiments, software running on one or more computer systems 200 performs one or more steps of one or more methods described or illustrated herein or provides functionality described or illustrated herein. Particular embodiments include one or more portions of one or more computer systems 200. Herein, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In particular embodiments, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate.

Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus that comprises:
a touch sensor that comprises a mesh of conductive material configured to extend across a display, wherein:
the mesh comprises a plurality of first lines and a plurality of second lines of conductive material, wherein:
the first lines are substantially parallel to each other; and
the second lines are substantially parallel to each other;
the display comprises a plurality of pixels that each comprise sub-pixels, wherein:
each of the pixels has a first pixel pitch ($PP_x$) along a first axis and a second pixel pitch ($PP_y$) along a second axis that is substantially perpendicular to the first axis;
each of the sub-pixels has a first sub-pixel pitch ($SPP_x$) along the first axis; and
each of the sub-pixels has a complex shape that has an average sub-pixel dimension ($SPD_{y,AVG}$) along the second axis;
the first lines are configured to extend across the display at a first angle relative to the first axis, wherein the first angle is approximately equal to the arctangent of $$\left(\frac{SPD_{y,AVG}}{PPx}\right);$$

and
the second lines are configured to extend across the display at a second angle relative to the first axis, wherein the second angle is approximately equal to the arctangent of $$\left(\frac{PP_y}{2 \times SPP_x}\right);$$

and
one or more computer-readable non-transitory storage media coupled to the touch sensor and embodying logic that is configured when executed to control the touch sensor.

2. The apparatus of claim 1, wherein:
each of the complex-shaped sub-pixels comprises an upper edge having a non-uniform shape;
each of the complex-shaped sub-pixels has a minimum sub-pixel height that is a distance between a lower edge of the sub-pixel and a minimum-height feature of the upper edge;
each of the complex-shaped sub-pixels has a maximum sub-pixel height that is a distance between the lower edge of the sub-pixel and a maximum-height feature of the upper edge; and
the average sub-pixel dimension along the second axis is a value between the minimum sub-pixel height and the maximum sub-pixel height.

3. The apparatus of claim 2, wherein the average sub-pixel dimension along the second axis is an average of the minimum sub-pixel height and the maximum sub-pixel height.

4. The apparatus of claim 1, wherein:
the first pixel pitch is a distance between corresponding features of two adjacent pixels along the first axis;
the second pixel pitch is a distance between corresponding features of two adjacent pixels along the second axis; and
the first sub-pixel pitch is a distance between corresponding features of two adjacent sub-pixels along the first axis.

5. The apparatus of claim 1, wherein:
first lines that are adjacent to each other are separated from each other along the first axis by a first-line horizontal separation distance that is within 1% of $k \times PP_x$, wherein k is a positive integer; and
second lines that are adjacent to each other are separated from each other along the first axis by a second-line horizontal separation distance that is within 1% of $$\frac{3}{4} \times k \times PP_x.$$

6. The apparatus of claim 1, wherein:
first lines that are adjacent to each other are separated from each other along the first axis by a first-line horizontal separation distance that is within 1% of $k \times PP_x$, wherein k is a positive integer; and
second lines that are adjacent to each other are separated from each other along the first axis by a second-line horizontal separation distance that is within 1% of $$\frac{13}{18} \times k \times PP_x.$$

7. The apparatus of claim 1, wherein the first and second lines of conductive material form a plurality of mesh cells, each mesh cell having a diagonal length of approximately 265 μm to 340 μm.

8. The apparatus of claim 1, wherein:
the first angle is oriented counterclockwise relative to the first axis; and
the second angle is oriented clockwise relative to the first axis.

9. The apparatus of claim 1, wherein:
the first axis is horizontal;
the second axis is vertical;
the first pixel pitch along the first axis is a pixel width;
the second pixel pitch along the second axis is a pixel height; and
the average sub-pixel dimension along the second axis is an average sub-pixel height.

10. The apparatus of claim 1, wherein one or more segments of one or more of the first or second lines are substantially sinusoidal.

11. The apparatus of claim 1, wherein:
the first pixel pitch and the second pixel pitch are approximately equal; and
the pixels are substantially square.

12. A touch sensor that comprises:
a mesh of conductive material configured to extend across a display, wherein:
the mesh comprises a plurality of first lines and a plurality of second lines of conductive material, wherein:
the first lines are substantially parallel to each other; and
the second lines are substantially parallel to each other;
the display comprises a plurality of pixels that each comprise sub-pixels, wherein:
each of the pixels has a first pixel pitch ($PP_x$) along a first axis and a second pixel pitch ($PP_y$) along a second axis that is substantially perpendicular to the first axis;
each of the sub-pixels has a first sub-pixel pitch ($SPP_x$) along the first axis; and
each of the sub-pixels has a complex shape that has an average sub-pixel dimension ($SPD_{y,AVG}$) along the second axis;
the first lines are configured to extend across the display at a first angle relative to the first axis, wherein the first angle is approximately equal to the arctangent of $$\left(\frac{SPD_{y,AVG}}{PP_x}\right);$$

and
the second lines are configured to extend across the display at a second angle relative to the first axis, wherein the second angle is approximately equal to the arctangent of $$\left(\frac{PP_y}{2 \times SPP_x}\right).$$

13. The touch sensor of claim 12, wherein:
each of the complex-shaped sub-pixels comprises an upper edge having a non-uniform shape;
each of the complex-shaped sub-pixels has a minimum sub-pixel height that is a distance between a lower edge of the sub-pixel and a minimum-height feature of the upper edge;
each of the complex-shaped sub-pixels has a maximum sub-pixel height that is a distance between the lower edge of the sub-pixel and a maximum-height feature of the upper edge; and
the average sub-pixel dimension along the second axis is a value between the minimum sub-pixel height and the maximum sub-pixel height.

14. The touch sensor of claim 13, wherein the average sub-pixel dimension along the second axis is an average of the minimum sub-pixel height and the maximum sub-pixel height.

15. The touch sensor of claim 12, wherein:
the first pixel pitch is a distance between corresponding features of two adjacent pixels along the first axis;
the second pixel pitch is a distance between corresponding features of two adjacent pixels along the second axis; and
the first sub-pixel pitch is a distance between corresponding features of two adjacent sub-pixels along the first axis.

16. The touch sensor of claim 12, wherein:
first lines that are adjacent to each other are separated from each other along the first axis by a first-line horizontal separation distance that is within 1% of $k \times PP_x$, wherein k is a positive integer; and
second lines that are adjacent to each other are separated from each other along the first axis by a second-line horizontal separation distance that is within 1% of $$\frac{3}{4} \times k \times PP_x.$$

17. The touch sensor of claim 12, wherein:
first lines that are adjacent to each other are separated from each other along the first axis by a first-line horizontal separation distance that is within 1% of $k \times PP_x$, wherein k is a positive integer; and
second lines that are adjacent to each other are separated from each other along the first axis by a second-line horizontal separation distance that is within 1% of $$\frac{13}{18} \times k \times PP_x.$$

18. The touch sensor of claim 12, wherein the first and second lines of conductive material form a plurality of mesh cells, each mesh cell having a diagonal length of approximately 265 μm to 340 μm.

19. The touch sensor of claim 12, wherein one or more segments of one or more of the first or second lines are substantially sinusoidal.

20. A method comprising:
depositing on a substrate a mesh of conductive material that comprises a plurality of first lines and a plurality of second lines of conductive material configured to extend across a display, wherein:
the first lines are substantially parallel to each other;
the second lines are substantially parallel to each other;
the display comprises a plurality of pixels that each comprise sub-pixels, wherein:
each of the pixels has a first pixel pitch ($PP_x$) along a first axis and a second pixel pitch ($PP_y$) along a second axis that is substantially perpendicular to the first axis;
each of the sub-pixels has a first sub-pixel pitch ($SPP_x$) along the first axis; and
each of the sub-pixels has a complex shape that has an average sub-pixel dimension ($SPD_{y,AVG}$) along the second axis;
the first lines are configured to extend across the display at a first angle relative to the first axis, wherein the first angle is approximately equal to the arctangent of $$\left(\frac{SPD_{y,AVG}}{PP_x}\right);$$

and the second lines are configured to extend across the display at a second angle relative to the first axis, wherein the second angle is approximately equal to the arctangent of $$\left(\frac{PP_y}{2 \times SPP_x}\right);$$

and
forming one or more electrodes of a touch sensor from the mesh of conductive material.

* * * * *